United States Patent
Arksey et al.

(10) Patent No.: US 12,080,024 B2
(45) Date of Patent: Sep. 3, 2024

(54) SYSTEMS AND METHODS FOR GENERATING 3D MODELS FROM DRONE IMAGING

(71) Applicant: NETDRONES, INC., Kirkland, WA (US)

(72) Inventors: Matthew Laurence Arksey, Seattle, WA (US); Deon Blaauw, Lisse (NL); Lucas Thomas Hahn, Brooklyn, NY (US); John Gordon McQueen, Seattle, WA (US); Satoshi Nakajima, Medina, WA (US); Guy David Byron Shefner, Coeur d'Alene, ID (US); Richard Chia Tsing Tong, Seattle, WA (US)

(73) Assignee: NETDRONES, INC., Kirkland, WA (US)

( * ) Notice: Subject to any disclaimer, the term of this patent is extended or adjusted under 35 U.S.C. 154(b) by 44 days.

(21) Appl. No.: 17/838,082

(22) Filed: Jun. 10, 2022

(65) Prior Publication Data

US 2022/0398806 A1 Dec. 15, 2022

Related U.S. Application Data

(60) Provisional application No. 63/209,392, filed on Jun. 11, 2021.

(51) Int. Cl.
*G06T 7/73* (2017.01)
*B64C 39/02* (2023.01)
(Continued)

(52) U.S. Cl.
CPC .............. *G06T 7/73* (2017.01); *B64C 39/024* (2013.01); *G01C 15/002* (2013.01);
(Continued)

(58) Field of Classification Search
CPC ......... G06T 7/73; G06T 17/10; B64C 39/024; G01C 15/002; G05D 1/0027; G05D 1/104;
(Continued)

(56) References Cited

U.S. PATENT DOCUMENTS 9,858,822 B1 1/2018 Gentry
10,186,049 B1 1/2019 Boardman et al.
(Continued)

FOREIGN PATENT DOCUMENTS

CN 111970709 A 11/2020
WO WO-2022198684 A1 * 9/2022
(Continued)

OTHER PUBLICATIONS

International Search Report and Written Opinion, mailed Aug. 17, 2022, for PCT Application No. PCT/US2022/072885, filed Jun. 10, 2022, 9 pages.
(Continued)

*Primary Examiner* — Maurice L. McDowell, Jr.
(74) *Attorney, Agent, or Firm* — MORRISON & FOERSTER LLP

(57) ABSTRACT

A method comprising receiving a plurality of images of a scene captured by at least one drone; identifying features within the plurality of images; identifying similar images of the plurality of images based on the features identified within the plurality of images; comparing the similar images based on the features identified within the similar images to determine a proportion of features shared by the similar images; selecting a subset of the plurality of images that have a proportion of shared features that meets a predetermined range; generating a first 3D model of the scene from the subset of images using a first 3D model building algorithm; generating a second 3D model of the scene from the (Continued)

subset of images using a second 3D model building algorithm; computing errors for the first and second 3D models; and selecting as the model of the scene the first or second 3D model.

14 Claims, 17 Drawing Sheets

(51) Int. Cl.
| | |
|---|---|
| G01C 15/00 | (2006.01) |
| G05D 1/00 | (2006.01) |
| G06N 20/00 | (2019.01) |
| G06T 17/10 | (2006.01) |
| G06V 20/17 | (2022.01) |
| G08G 5/00 | (2006.01) |
| H04B 7/185 | (2006.01) |
| H04B 17/318 | (2015.01) |
| H04W 4/02 | (2018.01) |
| H04W 4/40 | (2018.01) |
| H04W 24/08 | (2009.01) |
| H04W 28/24 | (2009.01) |
| H04W 64/00 | (2009.01) |
| B64U 10/13 | (2023.01) |
| B64U 80/86 | (2023.01) |
| B64U 101/20 | (2023.01) |
| B64U 101/30 | (2023.01) |
| H04W 84/04 | (2009.01) |
| H04W 84/12 | (2009.01) |

(52) U.S. Cl.
CPC ........... *G05D 1/0027* (2013.01); *G05D 1/104* (2013.01); *G06N 20/00* (2019.01); *G06T 17/10* (2013.01); *G06V 20/17* (2022.01); *G08G 5/0013* (2013.01); *G08G 5/0026* (2013.01); *G08G 5/0039* (2013.01); *G08G 5/0043* (2013.01); *G08G 5/0069* (2013.01); *H04B 7/18504* (2013.01); *H04B 17/318* (2015.01); *H04W 4/025* (2013.01); *H04W 4/40* (2018.02); *H04W 24/08* (2013.01); *H04W 28/24* (2013.01); *H04W 64/003* (2013.01); *H04W 64/006* (2013.01); *B64U 10/13* (2023.01); *B64U 80/86* (2023.01); *B64U 2101/20* (2023.01); *B64U 2101/30* (2023.01); *B64U 2201/102* (2023.01); *G05D 1/042* (2013.01); *H04W 84/047* (2013.01); *H04W 84/12* (2013.01)

(58) Field of Classification Search
CPC ........ G05D 1/042; G06N 20/00; G06V 20/17; G08G 5/0013; G08G 5/0026; G08G 5/0039; G08G 5/0043; G08G 5/0069; H04B 7/18504; H04B 17/318; H04B 17/27; H04B 17/3913; H04W 4/025; H04W 4/40; H04W 24/08; H04W 28/24; H04W 64/003; H04W 64/006; H04W 84/047; H04W 84/12; H04W 4/029; B64U 10/13; B64U 80/86; B64U 2101/20; B64U 2101/30; B64U 2201/102
See application file for complete search history.

(56) References Cited

U.S. PATENT DOCUMENTS

| | | | | |
|---|---|---|---|---|
| 2012/0320032 | A1* | 12/2012 | Zhu | G06T 17/00 |
| | | | | 345/419 |
| 2013/0293532 | A1* | 11/2013 | Vaddadi | G06T 15/005 |
| | | | | 345/419 |
| 2014/0180914 | A1 | 6/2014 | Abhyanker | |
| 2014/0200863 | A1 | 7/2014 | Kamat | |
| 2014/0212030 | A1 | 7/2014 | Tytgat et al. | |
| 2016/0275801 | A1 | 9/2016 | Kopardekar | |
| 2017/0018113 | A1 | 1/2017 | Lattanzi et al. | |
| 2017/0186177 | A1* | 6/2017 | Nagori | G06T 7/579 |
| 2017/0247108 | A1 | 8/2017 | Ljubuncic et al. | |
| 2017/0291704 | A1 | 10/2017 | Alegria | |
| 2017/0329297 | A1 | 11/2017 | Gilman et al. | |
| 2017/0357273 | A1 | 12/2017 | Michini et al. | |
| 2018/0002010 | A1 | 1/2018 | Bauer et al. | |
| 2018/0157255 | A1 | 6/2018 | Halverson et al. | |
| 2018/0188724 | A1 | 7/2018 | Jassowski et al. | |
| 2018/0315168 | A1* | 11/2018 | Kim | G06T 13/40 |
| 2018/0321692 | A1 | 11/2018 | Castillo-effen et al. | |
| 2018/0327091 | A1 | 11/2018 | Burks et al. | |
| 2019/0228573 | A1 | 7/2019 | Sen et al. | |
| 2019/0324456 | A1 | 10/2019 | Ryan et al. | |
| 2020/0082611 | A1 | 3/2020 | Haramaty et al. | |
| 2020/0134847 | A1* | 4/2020 | Gros | G06T 7/73 |
| 2020/0233411 | A1 | 7/2020 | Ivanov et al. | |
| 2020/0305847 | A1* | 10/2020 | Syu | A61B 8/12 |
| 2020/0377233 | A1 | 12/2020 | Harvey et al. | |
| 2021/0089134 | A1 | 3/2021 | Tran | |
| 2021/0142271 | A1 | 5/2021 | Burch, V et al. | |
| 2021/0263515 | A1 | 8/2021 | Henry et al. | |
| 2022/0114740 | A1* | 4/2022 | Shimizu | G06T 15/08 |
| 2022/0397971 | A1 | 12/2022 | Arksey et al. | |
| 2022/0399936 | A1 | 12/2022 | Arksey et al. | |
| 2023/0177968 | A1 | 6/2023 | Arksey et al. | |

FOREIGN PATENT DOCUMENTS

| | | |
|---|---|---|
| WO | 2022261674 A1 | 12/2022 |
| WO | 2022261676 A1 | 12/2022 |
| WO | 2022261678 A1 | 12/2022 |

OTHER PUBLICATIONS

International Search Report and Written Opinion, mailed Aug. 17, 2022, for PCT Application No. PCT/US2022/072886, filed Jun. 10, 2022, 10 pages.

International Search Report and Written Opinion, mailed Aug. 17, 2022, for PCT Application No. PCT/US2022/072890, filed Jun. 10, 2022, 15 pages.

International Search Report and Written Opinion, mailed Oct. 25, 2022, for PCT Application No. PCT/US2022/072887, filed Jun. 10, 2022, 12 pages.

Invitation to Pay Additional Fees, mailed Aug. 23, 2022, for PCT Application No. PCT/US2022/07887, filed Jun. 10, 2022, 2 pages.

Sharma, A. et al. (Sep. 2, 2020), "Communication and Networking Technologies for UAVs: A Survey," 24 pages.

Xu, D. et al. (Jun. 2019). "Monocular Depth Estimation Using Multi-Scale Continuous CRFs As Sequential Deep Networks," IEEE Transactions on Pattern Analysis and Machine Intelligence 41(6): 1426-1440.

* cited by examiner

400 Hardware Architecture
410 Drones
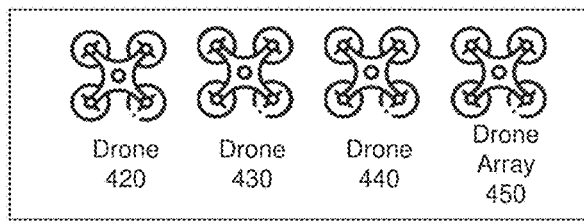
Drone 420   Drone 430   Drone 440   Drone Array 450
Drone LAN 4100
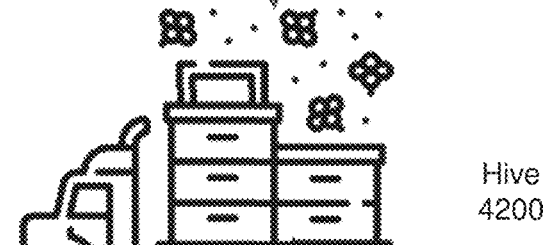
Hive 4200
Drone WAN 4300
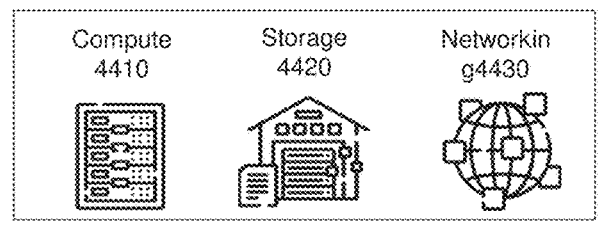
Compute 4410   Storage 4420   Networking 4430
Cloud Services 4400
FIG. 4

Fig. 5 Drone Software Architecture

8500 Overview of System

900 Hive Software Architecture

SYSTEMS AND METHODS FOR GENERATING 3D MODELS FROM DRONE IMAGING

PRIORITY

This application claims the benefit, under 35 U.S.C. § 119(e), of U.S. Provisional Patent Application No. 63/209,392, filed Jun. 11, 2021, which is incorporated herein by reference in its entirety.

TECHNICAL FIELD

This disclosure generally relates to drone imaging, and more specifically, to generating a 3D model from drone imaging.

BACKGROUND

Over the last 50 years there have been successive waves of billions of enduser computing devices driven by tremendous cost declines in semiconductor hardware. In the 1980s, microprocessors made computations became essentially free and ubiquitous. This enabled a new generation of software that led to the "Personal Computer (PC) revolution."

In the 2000s, the semiconductor revolution arrived for communications technology, connecting devices worldwide. Free computation and communications enabled a new generation of software that led to the "Mobile revolution."

In the 2010s, the integration of lowcost imaging chips made cameras and other sensors essentially free and ubiquitous. Free computation, communications, and sensing enabled a new generation of Internet of Things (IoT) software, which ushered in a revolution in Smart Home, Office, and Factory technology. IoT refers to physical objects with sensors, processing ability, software, and other technologies configured to connect and exchange data with other devices and systems over the Internet or other communications networks.

Now, in the 2020s, the next revolution has arrived. Motors and batteries driven by hardware technology have made motion essentially free. However, there is still a need for a new generation of software that takes advantage of free computation, communications, sensing, and now motion.

The history of innovation has followed a cycle over the last 40 years. As seen, for example, with reference to FIG. 1, cycle 100 first begins with the hardware innovation that makes some formerly expensive part of the ecosystem effectively "free," leading to the personal computer (PC) revolution. That is, the cost of computation in the 1980's dropped so much, that use of the PC became ubiquitous. Furthermore, the semiconductor revolution begot the mobile revolution. This then enabled the software revolution that exploited that power, thus entering into the IoT era. Finally, the enduser revolution arrived with first millions then billions of devices were available to everyone.

Then innovation proceeded to another component, until the addition of free motors, which refers to everything that can move and everything that can be controlled. The final component of cycle 100 is the revolutions taking place to enable the "drone revolution."

The hardware that is enabled by motors, particularly motors used for drones, is still in its infancy. There are several large areas where this will have massive impacts.

The first area where a massive impact will be felt by the developments in motors includes flying drones, which is also referred to herein interchangeably as Unmanned Aerial Vehicles (UAVs). There are many different kinds of drones. As defined herein, a drone refers to an autonomous agent capable of navigating through physical environments (e.g., through air, solid surface, liquid surface, through water) without human intervention. The large categories include Vertical Takeoff and Landing (VTOL) devices that have two or more motors. VTOL devices with two or more motors are generally referred to as helicopters. However, if the VTOL device includes four motors, it can be referred to as a quadcopter. A quadcopter can also be referred to as a quadrotor, which refers to a specific implementation of a drone including four brushless DC motors and propellers. In addition, some VTOL devices having six motors are referred to as hexacopters, and those including eight motors are referred to as octocopters. Some VTOL devices may include even more motors, with the one, four, six, or eight motors of the helicopter, quadcopter, hexacopter, or octocopter, respectively, driving one or more rotors.

Some additional types of VTOL devices include fixed wing UAVs. Fixed wing UAVs can travel greater distances than VTOL devices, however they are generally unable to hover in a given location for long. Fixed wing UAVs generally have greater range and efficiency than VTOL devices. Fixed wing UAVs may also include lighterthanair crafts that use balloons or blimp structures filled with helium, hydrogen, or other gasses. In addition, VTOL devices may include hybrids of VTOL devices (e.g., rotatingwing craft that can take off vertically, and fly using a wing or copters) and fixed wing UAVs. Such hybrid devices may be powered by electricity using batteries, internal combustion, hydrogen, nuclear, or other power sources, or combinations thereof.

Another category of UAV includes Wheeled Drones or Autonomous Vehicles (AVs). The most common form are selfdriving vehicles (e.g., cars, trucks, etc.). Unlike flying drones, AVs work in a 2D space, such as on roads. AVs may include delivery drones that run on sidewalks, as well as tractors, and wheeled and tracked vehicles that can move offroad.

Another category of UAV includes Walking Drones or Robots. Walking drones are typically biped or quadped with legs that allow increased maneuverability.

Still another category of UAV includes Swimming Drones, Sailing Drones, or Submersible Drones, which may be referred to interchangeably as "underwater autonomous vehicles." Underwater autonomous vehicles typically are deployed underwater, such as in nature or which float on the water. Underwater autonomous vehicles may use hydrofoils to lift their bodies out of the water and to submerge. Underwater autonomous vehicles may use propellers, water jets, rockets, or other forms of propulsion.

Yet still another category of UAV includes hybrid drones. Hybrid drones may a combination of characteristics. For example, a hybrid drone may include an amphibious drones having wheels or tracks, as well as being able to float, such as by using the motion of the tracks, or specific propellers, or jets.

Today, flying drones are commonly controlled by humans via remote control through a wireless link. There is typically a 1:1 ratio of operator to drone as mandated by current FAA regulations. Small UAV (sUAV) are regulated by various Federal aviation authority (FAA) regulations with Part 107 (and successors) being the most common used for commercial operations regulate the piloting of drones. As specified in Part 107, sUAVs are classified as those UAVs having a weight of less than 55 lbs. (25 kgs).

A drone's typical operation focused on some common applications, as detailed below.

One application of a drone may include surveying. Surveying may relate to capturing images of buildings, homes, factories, facilities, agricultural fields, public spaces, or other geographical locations. VTOL devices are commonly used for surveying because VTOL devices are typically smaller and less expensive than manned aircraft and can obtain images having more features. Surveys are generally designed for precise physical measurements to provide a longterm measurement of structures, such as buildings or fields. Surveying is generally infrequently performed and added to archives, for example to record an exact "asbuilt" structure versus what is in design documents.

Another application of a drone may include inspecting or performing inspections. Structures like bridges, industrial plants, commercial buildings, towers, wind turbines, solar plants, or roofs need regular inspection to ensure they are working properly and not subject to failure. Each structure has specific needs for inspections. For example, inspection of bridges may include determining whether a given bridge has any cracks or failures in its structures or to detect an amount of rust present. With industrial plants, inspections include both determining whether unusual noises and smoke and steam that is not normal are present. And with commercial buildings, inspections may include determining whether the building has any cracks, leaks, or standing water, or other potential abnormal characteristics. Finally, cell towers and radio towers may require other specialized inspection. For example, there are many specific requirements for different industrial structures that require a general system for identifying specific assets and also flight planning differs dramatically for these different structures.

Another application of a drone may include reconstructing three-dimensional (3D) models, Digital Twins, or 4D Reconstruction. 4D, as described herein, refers to a three dimensional model with a time varying component showing visual and structural changes as a function of time. With enough images, a 3D model of a site can be built through the techniques of photogrammetry. Long term, a "timestamped digital twin" of at first single sites and in the limit the entire planet can be constructed to determine what is happening at any location at any given time. This is process is generally referred to as performing a 4D reconstruction.

Still another application of a drone may include security and monitoring. Flying drones, in particular, are well suited to perform roving security where having a large number of fixed cameras is too expensive or impractical. These roving patrols allow security for large pipelines, large industrial assets, or other locations.

Still another application of a drone may include photography. The photography may include capturing of images for sale or lease, or for film and images. For example, drones may be used to capture images of property to be sold or exhibited. As another example, drones may be used for capturing images and/or video for artistic purposes.

Yet another application of a drone is delivery of items. Short and long range delivery may be performed via fixed wing drones.

Yet still another application of a drone is drone taxing. Companies may use drones to taxi humans or other living creatures from location to location.

SUMMARY OF PARTICULAR EMBODIMENTS

According to an aspect, a system performs optimized highdimensional model synthesis leveraging kernel computation, data compression, and graphical rendering alongside dronespecific heuristics to efficiently create highfidelity, highdimensional models that include comprehensive semantic scene understanding to a greater degree than currently available solutions.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 4 is an illustrative diagram of an overall system including one or more drone pods, in accordance with various embodiments.

DETAILED DESCRIPTION

Figure 1:
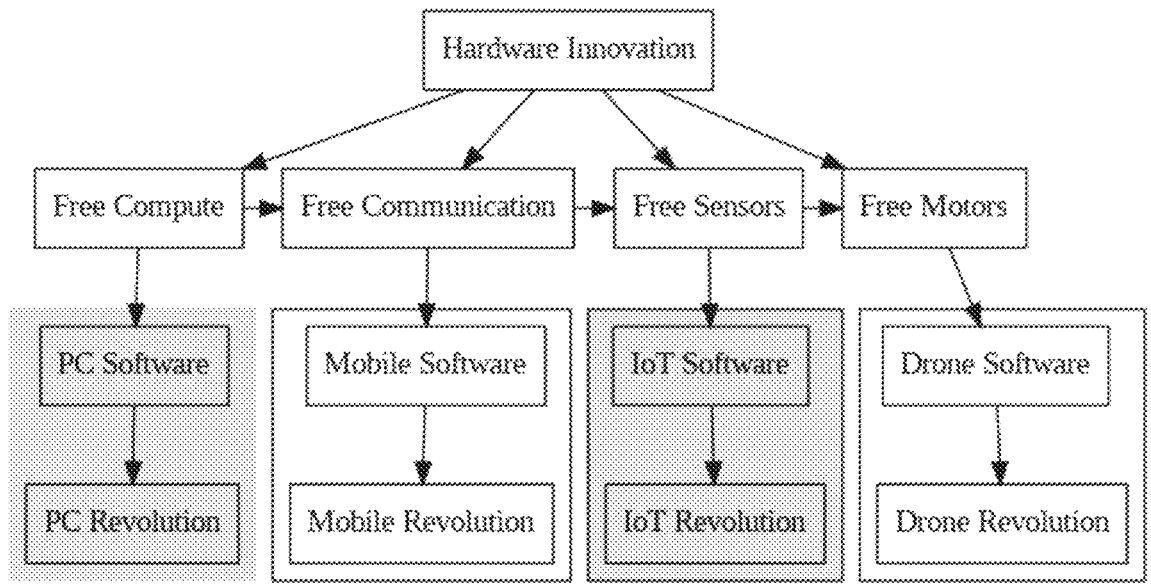
FIG. 1 is an illustrative schematic of the cycle of innovation over the last 40 years, in accordance with various embodiments.

HighDimensional Model Synthesis (HDMS) refers to the process of compositing sets of lower dimensional data related to a discretely bounded scene, which may include images, IMU readings, GPS locations, or any other sensor information, into a coherently integrated, higher dimensional representation of the scene. Higher dimensional forms may include point clouds, radiance fields, depth maps, or various other methods of representing three-dimensional data. A time component may be added to a three-dimensional model, and other measurements can be incorporated alongside the temporal dimension (temperature, wind, object detection, etc.) to expand the dimensions further. Model synthesis is a fundamental problem of computer vision and has countless applications to several industries (site monitoring for surveying and construction, asset creation for entertainment experiences, scene understanding for augmented reality, etc.), current methods suffer from a litany of issues pertaining to reconstruction accuracy and computational efficiency.

A traditional approach to the problem, photogrammetry, includes extracting relevant points of interest from a set of images, exhaustively matching these points with each other across the dataset, then triangulating the matched points into a sparse set of predicted camera poses and three-dimensional points. However, SfM's computational efficiency scales exponentially alongside the size of the dataset, and is prone to alignment errors or poor surface interpolations which result in frequent artifacts and excessively long compute times.

An alternate approach to model synthesis is entitled NeRF, or Neural Radiance Fields, in which a neural network is trained to accurately predict the density, color, or other quantities at all points within the scene, viewed from any angle. As is known in the art, a neural radiance field (NeRF) is a fully-connected neural network that can generate novel views of complex 3D scenes, based on a partial set of 2D images. It is trained to use a rendering loss to reproduce input views of a scene. With this trained neural network, highly photorealistic views of the scene can be rendered by calculating these densities and colors at all points within a certain field of view, and leveraging preexisting techniques in volume rendering to combine them into a coherent image. While it promises higher reconstruction fidelity from a smaller amount of low-dimensional data, NeRF is still in its infancy as a technology, and as such is severely limited in the size of scene it can represent, and rendering novel views is highly inefficient.

Further, traditional model synthesis techniques tend to make poor use, or no use at all, of acquisition tool-specific knowledge, such as multiple cameras capturing the scene simultaneously, temporal assumptions on video frames, or device-specific sensor data.

According to various aspects, the systems and methods described herein can provide improvements related to leveraging drone specific heuristics to enhance the efficiency and fault tolerance of high-dimensional model synthesis. Where traditional methods tend to take only images as their inputs, the invention disclosed in this patent takes advantage of the fact that drones have a general understanding of their absolute position in space, and each drone in a set of drones has an understanding of its relative position to other drones. Further improvements pertain to either novel algorithms or optimizations to existing algorithms, which enhance either the accuracy or efficiency of high-dimensional model synthesis. Both categories of improvements contribute to a system that enables for faster computation of accurate models at a large scale.

Particular embodiments disclosed herein may provide one or more of the following results, effects, or benefits: optimizations and innovations upon traditional model synthesis methods disclosed in herein enable a higher volume of accurate, high-fidelity high-dimensional models to be processed and stored at a scale that is not currently possible with existing technology. Additionally, systems and methods described herein allows for models to be computed on lower-end hardware systems.

Further, photogrammetry (SfM) and NeRF based models have different relative strengths and weaknesses. SfM requires a large amount of images as input and is not robust to gaps in the scene if any spots have low coverage in the image dataset, these locations are likely to have holes or other artifacts in the constructed model. While NeRF may fail to generate any coherent results on large scenes, it may perform better than SfM in representing scenes with smaller datasets, avoiding the same geometric distortions as SfM. By computing both types of models, the system may produce high quality models in instances where traditional, single strategy systems may fail.

As is known in the art, a NeRF generated 3D model only stores the weights of the underlying neural network, while a SfM generated 3D model may represent the data in a variety of formats. These different formats all tend to store the following information in some way: 1. 3D geometry whether as a set of triangles, or a long list of points (xyz locations) 2. Texture information some type of 2D texture information (like an image of a brick wall pattern, for example) and a map of how this 2D texture is projected onto the scene geometry 3. Prebaked lighting a lot of times, information like normal maps or light reflectance is precomputed, and then this information is stored alongside the model so that the computation of how light reflects off of a given surface does not have to be computed in real time, but rather can just become a lookup table). Note that part of the usefulness of NeRF is that, where SfM models need to explicitly store all of this information and it often will take up gigabytes, with the neural network all you have to keep track of is the model weights, and the rest of the information for rendering a 3D model is generated by the neural network based on its weights.

Particular embodiments disclosed herein may be implemented using one or more example architectures.

Hardware Architecture

As described in more detail below with reference to FIG. 2, a single drone may contain a flight computer 290 which may have low level control of the actual operation of the drone. It may include an onboard IMU 210 which provides compass, accelerometer and other movement data, and a GPS 230 which reports location. It may house a telemetry radio 250 which provides movement instructions or instructions for flight. It then may actuate 240 motors that then power rotors 220 using electronic speed control circuitry 245 to keep speed consistent. It also includes a frame and landing system 260, and various visual markers such as QR codes or calibrated length measures 270. It may contain one or more sensors such a camera system 295 or LIDAR, and may include navigation lights 297 that may flash patterns to signal. It may be connected to other systems with a flight LAN or serial bus 2310.

A single drone may include a safety computer 2100 which isolates the mission critical flight hardware from the companion computer 2200. It monitors the data requests and flows and can restrict the companion computer 2200 in the event that it determines an intolerable error has occurred. The flight safety computer may include 2520 active safety devices such as parachutes or inflating balloons to lower the speed in case of failure and encase rotating or sharp parts. It may contain a destruct 2530 system to convert the drone into several smaller components with less kinetic energy and risk for causing lacerations.

A single drone may also include a companion computer 2200, which may contain AI accelerators, including but not limited to GPUs 2205 to improve neural network performance, a sensor payload of one or more cameras or lights or other sensors 2210 that provide imaging of the surrounding environment, IMU 2230, and GPS 2220 to provide base location information, compass, accelerometer and other data on the physical location of the drone, or storage 2240 for programs and data. The companion computer may also include a user interface mechanism such as a touchpad and screen 2270, and may communicate with other modules on the drone through a LAN 2320 or similar USB, or other, communications system. A single drone may also use ultra-wide band 2230 or Bluetooth 2280 technology for proximity sensing and local communications. It may also include Wireless LAN 2290 technology based on cellular, WiFi or other protocols. These antennas may both send information and passively record the signal strengths as the drone travels, enabling mapping of the 3D environment.

A single drone may also include charging 2420 for batteries 2410, and attachments for active safety gear 2520 such as airbags, balloon and parachute and also self destruct mode hardware 2530. It may also include a lighting system 2250 for identification and visibility and also an audio 2260 system, which may include speakers and a microphone. USB, or other serial connections 2295, may be included to attach additional peripherals.

As described in more detail below with reference to FIG. 3, a hive (described further below) may include one or more landing or takeoff systems with passive visual or active lighting or RF beacons to allow drones to localize site 3160 and may include recharge 3150 that may be automatically connected when a drone lands. As used herein, the term "central command system" can be a hive or a cloud.

A hive may include one or more markers 3180, either static or optical. It may also include multiple lights allowing blink patterns to aid in localization 3190. In addition, the hive may include multiple RF beacons such as Bluetooth LE or UWB that provide precise localization on the various parts of the hive 3230. The hive itself may have markers such as QR codes, calibrate measurement rulers as part of any of these systems.

A hive may have one or more LAN access points 3250 that may cooperate to produce MUIMO that allow multiple streams to multiple drones simultaneously. It may have one or more wide area network links to the cloud 3270 such as a satellite or cellular modem. It may include one or more GPS receivers that may support high precision location estimating using differential GPS or RTK 3290. These antenna systems may be attached or separate or placed on separate positioning mounts 3210 that may themselves be autonomous and movable to get the best signal. The hive has an AI Computer 3110, and may contain a disk array for storage 3120. It also includes a power supply for the hive itself and to recharge drones 3150. It also includes the network switch and routing hardware to connect these components 3140. The switch may be intelligent and handle multiple connections upstream to the cloud or other drones and to individual drones. It may also include recharging for the drones and also for the onboard power systems 3130. Finally, the hive itself may be autonomous and has an input to the drive interface 3200 of the vehicle to enable movement of the entire hive.

As described in more detail below with reference to FIG. 4, an overall system may include one or more drone pods as described in 410. A drone pod 410 consists of a collection of one or more drones, 420, 430, 440, 450, etc. which are operating as a unit and perform missions together for planning purposes. Each drone pod 410 may have different functions. They may communicate through a Drone LAN 4300 that is created by one or more Hive LAN Access Points 3150. There may be one or more hives 4200 that are in turn connected to one or more a Drone wide area a drone pod may have traditional cameras, lighting devices to illuminate shadows, lidar, radar, audio or other sensing devices. These pods may network 4300 to each other and to cloud services 4400 which may be hosted remotely and may contain services such as Computer Services 4410, Storage services 4420 and networking and routing services 4420.

Software Architecture

As described in more detail below with reference to FIG. 5, the drone companion computer 5300 may include a local pose estimator 5320 and a local mapper 5330. The pose estimator provides information about the drone's position in space, specified by a three-dimensional point and a viewing angle. The local mapper provides frequently updated information about the drone's surroundings. As shown in the functional block diagram of FIG. 6, the AI and compute module 3110 aboard the hive 3100, as well as the cloud compute module 4410, may host the software components for the model synthesis 6300, model compression 6400, and model decompression 6500 systems.

Images 6100 may be captured from a wide array of camera devices, including but not limited to drones, mobile phones, or DSLR cameras. Depending on the camera device used to capture an image, the image may also contain metadata in a format such as EXIF, which may encode additional information about the image such as GPS coordinates, camera orientation, camera intrinsics, or timestamps describing when the image was captured.

The model synthesis system can include a feature extractor 6310, an image matcher 6320, a feature matcher 6330, an image pruner 6340, a semantic segmentation module 6350, a photogrammetry subcomponent 6360, and a NeRF subcomponent 6370.

The feature extractor 6310 takes images 6100 as input, and outputs a set of locations within each input image that represent recognizable points of interest in the image with the potential to be matched across images taken from different viewpoints. One skilled in the art will recognize that feature extraction may be performed by SIFT, SURF, BRISK, ORB, or a multitude of other keypoint extraction algorithms.

The image matcher 6320 takes a set of images 6100 as input and outputs a covisibility graph in which vertices represent images, and edges represent covisibility. One skilled in the art will recognize that image matching may be performed by photometric (directly comparing pixel intensities), local feature-based (directly comparing extracted local keypoints), or neural (directly comparing intermediate vectors computed by a deep neural network) methods. The image matching architecture disclosed in this patent may include a neural network 6390, which converts images to a fixedsize global feature vector 6390.1.

The feature matcher 6330 takes as input sets of local features extracted using the feature extractor 6310, and the image matcher 3320, and provides candidate matches between features extracted from different images. Feature matching may be performed naively by directly comparing keypoints, or in an optimized probabilistic fashion that compares a reduced number of points. Feature matching is an inherently error-prone process, and thus an outlier filtering algorithm such as RANSAC may be employed to provide more robust matches. One skilled in the art will recognize that several different data structures may be equivalently applied to The image pruner 6340 takes as input the image graph from the image matcher 6320, the matched sets of local features from the feature matcher 6330, and the set of input images 6100, identifying both redundant images that exceed a threshold of similarity to other images in the input dataset, and irrelevant images which cannot be determined to exist within the scene.

The semantic segmentation module 6350 may label every pixel in the set of input images with a label corresponding to the object with which it is associated (car, wall, tree), but it may employ sparser methods as well, only outputting bounding boxes of known objects within each image. One skilled in the art will recognize that several different architectures may be used to implement this module, including but not limited to convolutional neural networks, transformers, or Haar features.

The photogrammetry subcomponent 6360 includes a structure-from-motion (SfM) module 6360.1, which may take the matched and pruned images and features from the image pruner, as well as additional information from the drone local pose estimator 6200, and iteratively grows a set of both three-dimensional points, triangulated from the two-dimensional local features, and camera poses, which consist of a global location and a viewing angle. The photogrammetry module may include a meshing and texturing system 6360.2, which takes the set of three-dimensional points given by the SfM module 6360.1 and estimates a surface that connects some, or all, of the points, and maps two-dimensional textures from the original images onto the newly reconstructed three-dimensional space.

The NeRF subcomponent 6370 consists of at least one deep neural network 6370.1 and a set of supporting data structures, including but not limited to an occupancy grid 6370.2, a collection of hash tables 6370.3, and a temporal cache 6370.4. One skilled in the art will recognize that the deep neural network may take the form of several different architectures, such as a multilayer perceptron, a transformer, or a convolutional neural network. An occupancy grid may refer to any data structure that encodes positions in three-dimensional space and represents them as either empty, occupied, or unknown. The hash tables 6370.3 allow for the fast querying of feature vectors generated by the output and intermediate outputs of the NeRF neural network 6370.1. The NeRF subcomponent may take as input camera poses from the drone local pose estimator 6200 or the photogrammetry subcomponent 6360.

The model compression system 6400 reduces the size of synthesized models in computer memory. It consists of a deep neural network 6410 with agnostic architecture, with any of the architectures that may be employed in the NeRF subcomponent as a candidate design. The model decompression system 6500 includes a NeRF rendering tool 6510 which renders NeRFs directly, and a conversion module 6520 that converts NeRFs into standard three-dimensional data formats such as point clouds or meshes. One skilled in the art will recognize that several existing methods may be used to convert a NeRF into a mesh, such as the marching cubes algorithm. Models are stored in cloud storage 6600.

Particular embodiments disclosed herein may be implemented using one or more example processes.

Figure 7A:
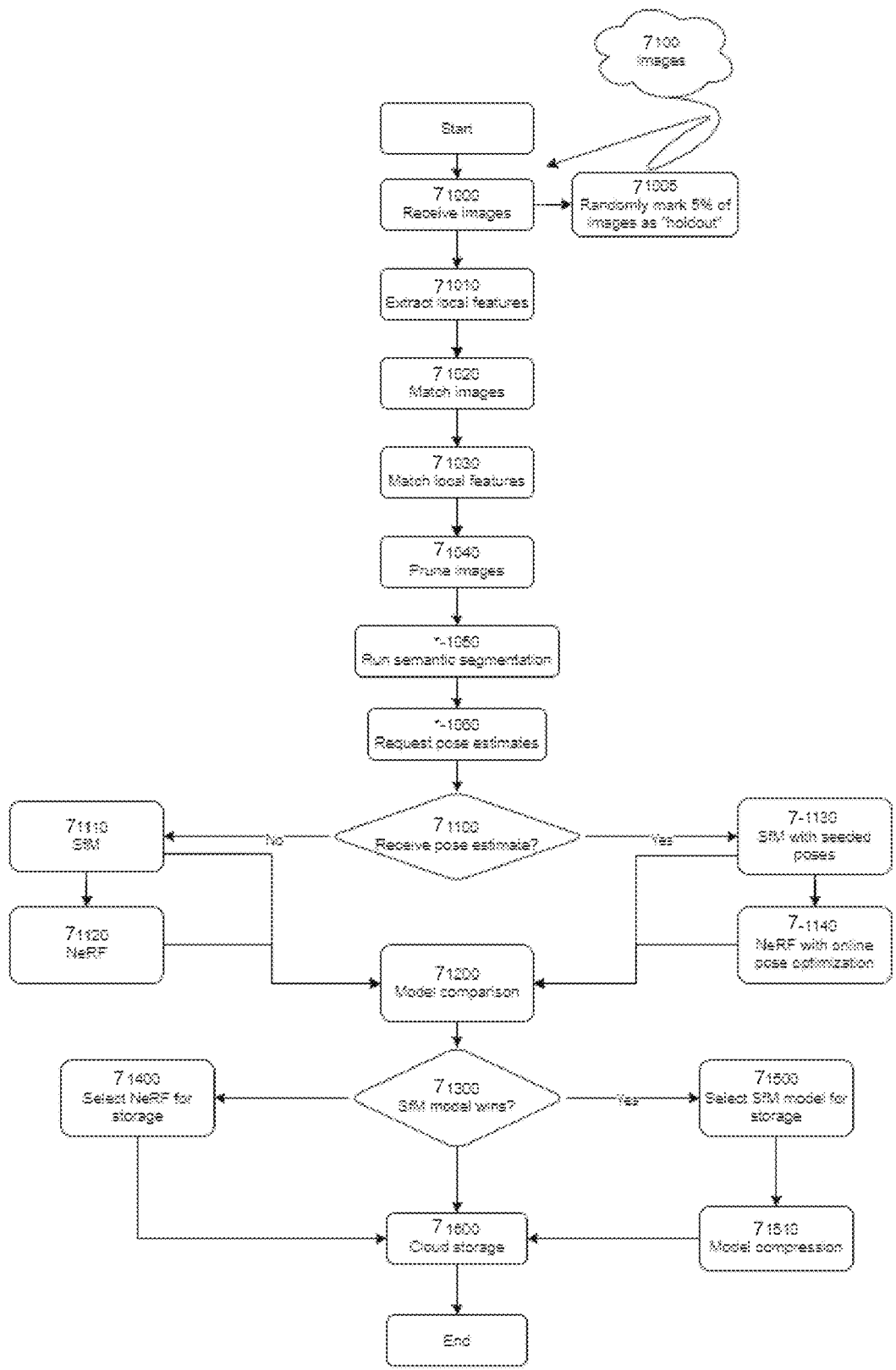
FIG. 7A illustrates a flow diagram of an exemplary method for converting a set of images into a high-dimensional model.

FIG. 7A illustrates a flow diagram of a set of images 7100 being reconstructed into a high-dimensional model stored in cloud storage 71600. In step 71000, images are received from a camera device, such as a drone, a mobile phone, or a DSLR. In step 71005, 56 of the inputted images are marked with a "holdout" tag, designating that their poses should be computed, but their local features should not be triangulated into the three-dimensional space, allowing for later model validation and testing. In step 71010, the feature extractor computes local features in each image.

Figure 7B:
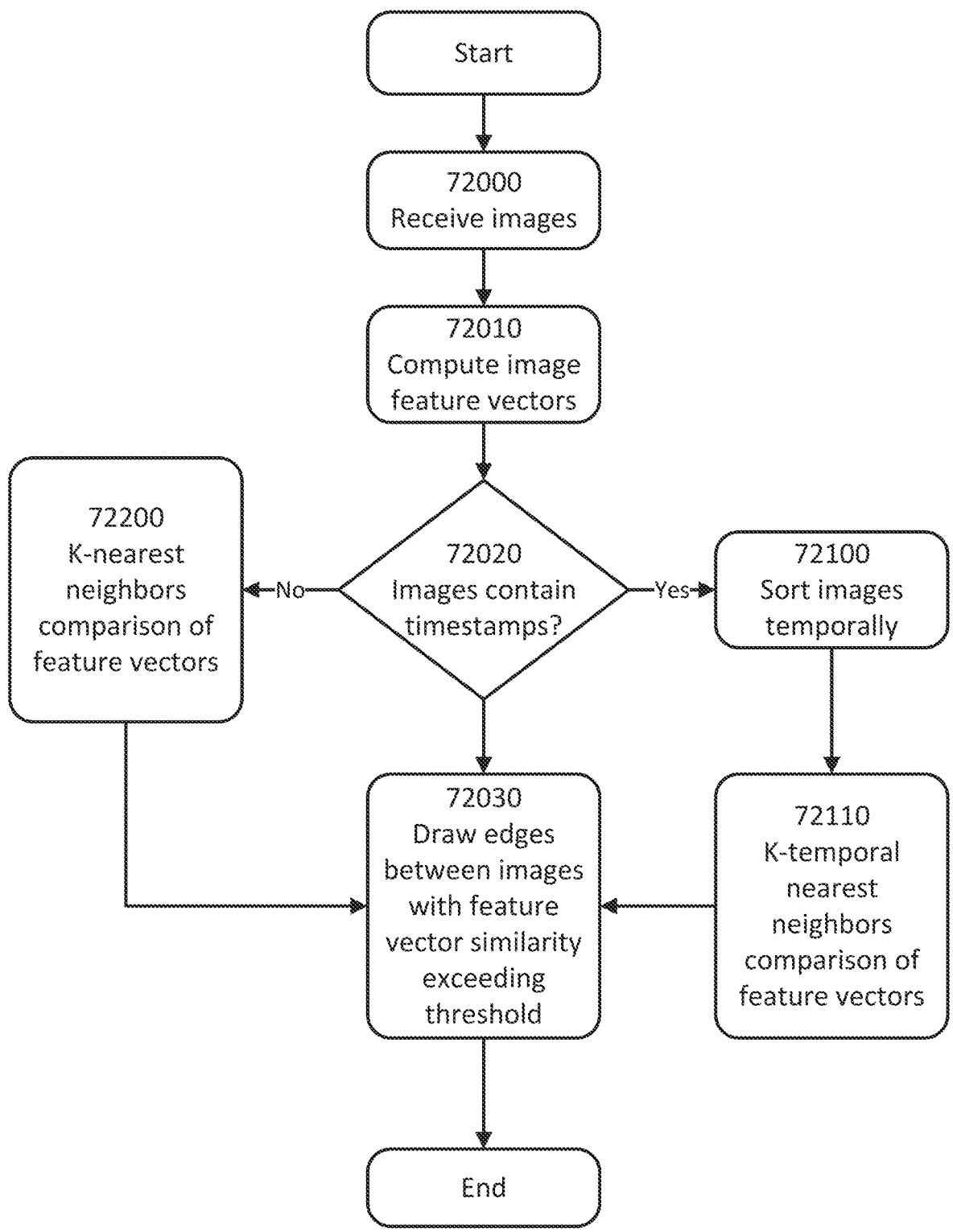
FIG. 7B illustrates an exemplary method for generating a covisibility map.

In step 71020, the image matcher computes a covisibility graph from the images. The steps for covisibility graph computation are shown in FIG. 7B. In step 72000, the image matcher receives images from the input devices. In step 72010, a neural network converts each image into a fixed-size global feature vector 6390.1, which encodes information about the contents of the image. One skilled in the art will recognize that the neural network may be pretrained on preexisting large image datasets, such as CIFAR10, ImageNet, or MS COCO, and that the neural network may be implemented with many different architectures including but not limited to a convolutional neural network, a recurrent neural network, or transformer. In step 72020, the metadata of the input images is checked for the presence of timestamps. If timestamps are found, in step 72100 the images are sorted in temporal order from oldest to newest. In step 72110, the feature vectors extracted in step 72010 are compared with a distance metric such as Euclidean distance. One skilled in the art will recognize that any distance metric may be mathematically inverted to provide a similarity score ranging from 0 to 1, with scores closest to 1 indicating similarity, and thus each distance is converted to a similarity score. Feature vectors are only compared with 306 of the total images in the dataset for example, if there are onehundred images, a given image's feature vector will be compared only to the fifteen images taken directly after, and the fifteen images directly before the image was captured. If no timestamps are found, in step 72200 the similarity scores are computed exhaustively across the entire dataset. In step 72030, an edge is drawn between images whose feature vectors have a similarity score of 0.15 or higher.

Figure 7C:
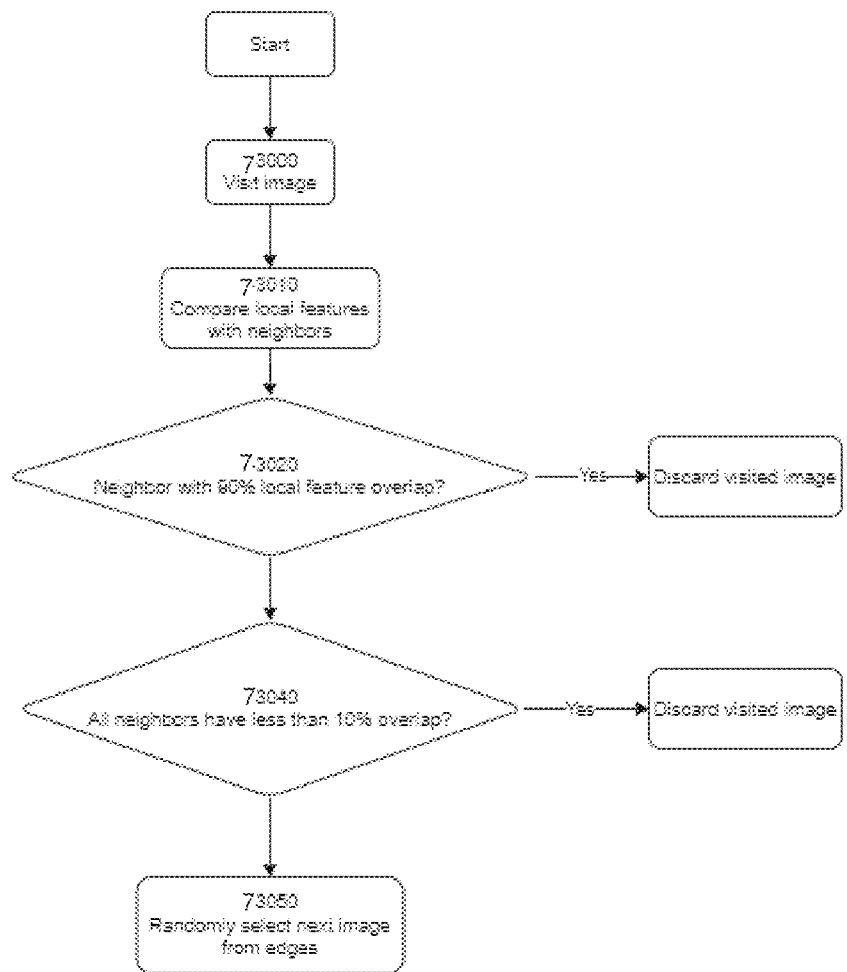
FIG. 7C illustrates an exemplary method for reducing the image dataset.
Figure 7D:
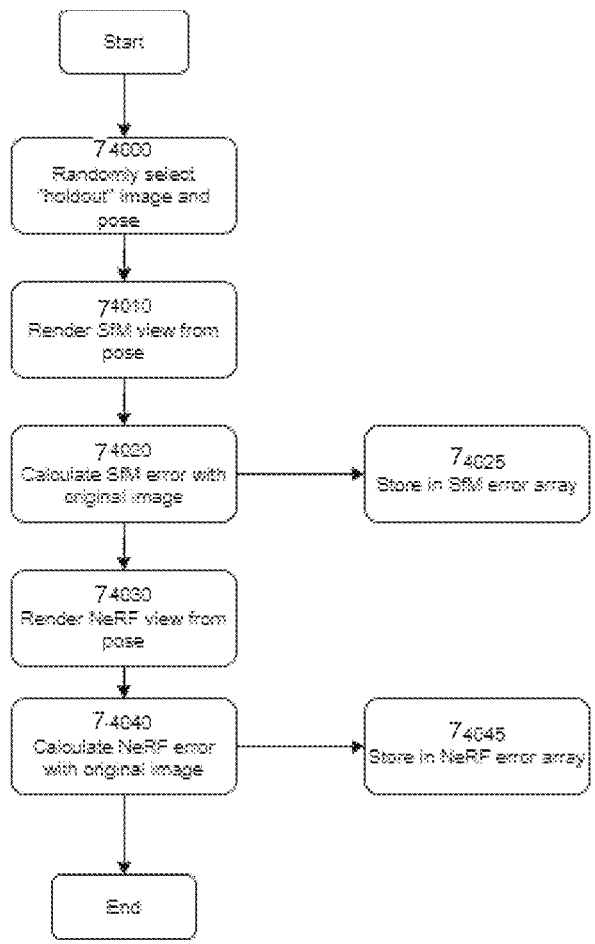
FIG. 7D illustrates an exemplary method for comparing 3D models.
Figure 7E:
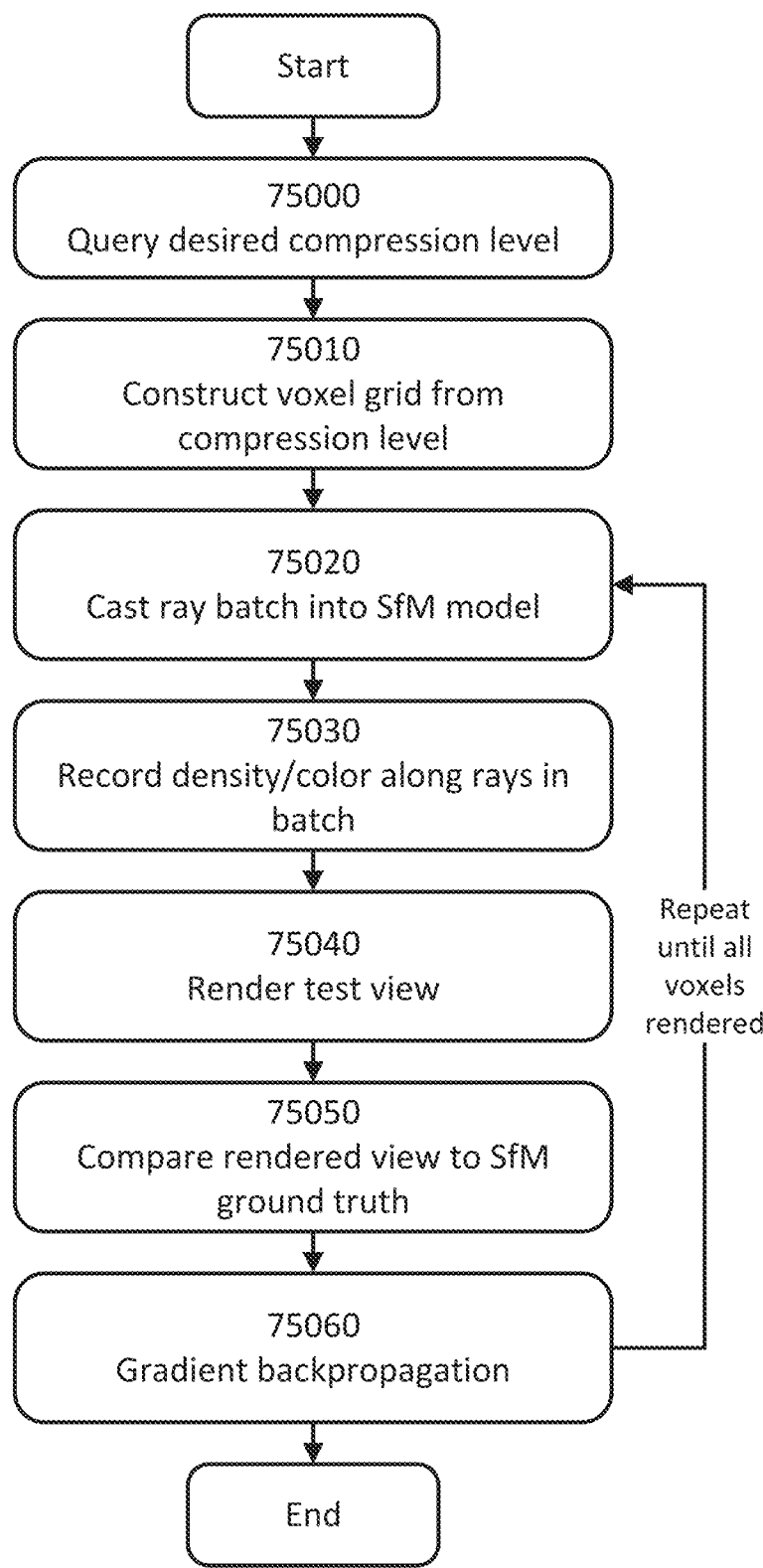
FIG. 7E illustrates an exemplary method for model compression.

In step 71030, local features are matched between images by the local feature matcher. In step 71040, the image pruner reduces the size of the image dataset with the following algorithm, described in FIG. 7C. The image covisibility graph is traversed in an outside in fashion. First, in step 73000 the image with the least edges is picked as a starting point for the traversal. If more than one image may meet this criterion, the starting point is randomly selected from eligible candidates. For each image visited in the graph, local features are directly compared to all images which share an edge with the visited image in step 73010. This information is readily accessible and queryable, as local features are distinguishable across different images, and the feature matcher has already identified and cached matches. As a preliminary threshold, in step 73020, if the visited image shares more than 906 of the same features with any other image in the graph. In step 73030, if the image is found to have less than 106 overlap with all other images with which it shares an edge, it is discarded as well. In step 73050, an image is randomly selected from the visited image's edges, and steps 73010 through 73050 are repeated until all images in the graph have been visited.

In step 71050, each image is augmented with a pixel-wise mask. In the mask, each pixel is labeled with an object that it belongs to (car, wall, tree). The pixel-wise mask is used downstream for error correction.

In step 71100, the presence of estimated poses determines the operative mode of both the SfM and NerF systems. If no estimated poses are found, then in step 71110, SfM computes camera poses and synthesizes a three-dimensional model from scratch. In step 71120, NeRF computes an additional three-dimensional model using the camera poses calculated in step 71110. If estimated poses are found, in step 71130 the SfM module will skip intermediate pose estimation steps and instead use the provided poses as an initial measurement. In step 71140, the NeRF module uses the estimated poses to compute a NeRF model, and a head of the neural network refines these initial estimates alongside the density and color computing heads of the network. If estimated poses are available, note that SfM and NeRF may run in parallel, as the NeRF module no longer relies on the poses computed by SfM for training. One skilled in the art will recognize that traditional bundle adjustment is an error correction technique commonly used in SfM in which three-dimensional triangulated points are reprojected into their original two-dimensional images. The error between the reprojected points and the original two-dimensional points is used as a signal for gradientbased optimization to either refine the position of the three-dimensional points, or to throw them out altogether. The model synthesis system disclosed in this patent also employs object-based bundle adjustment. In object-based bundle adjustment, the pixel-wise mask calculated in 71050 is leveraged as an extension to the traditional error calculation.

Not only are errors in two-dimensional location punished, but also deviations in object class. If a reprojected pixel falls into a location outside of the original point's object space, a higher error will lead to more dramatic correction, an additional geometric check that ensures the structural cohesion of reconstructed objects.

In step 71200, the NeRF models and SfM models are quantitatively compared to determine which model strategy has achieved a higher quality. Flowchart 7D illustrates one iteration of the model comparison process. In step 74000, an image marked with the "holdout" tag from step 71005 is randomly selected alongside its pose. In step 74010, the SfM model is viewed from the pose associated with the holdout image, and in 74020 the rendered view is compared to the original image with an error metric such as PSNR, which gives the signal-to-noise ratio of the rendered image overlaid on top of the original image. In step 74025, this error is stored into a data structure such as an array. In step 74030, the NeRF model is rendered from this same view, and in step 74040 the error is calculated identically to 74020 and similarly stored in 74045. After all "holdout" images have been rendered, the average error of the arrays constructed from steps 74025 and 74045 is calculated, and the model with the lowest error is declared to be the higher quality model.

In step 71300, the system queries which model won in model comparison. In the event that the NeRF model is selected 71400, it is directly uploaded to cloud storage in step 71600, and the reconstruction pipeline is complete.

If the SfM model is selected in step 71500, then in step 71510 it is compressed with a novel NeRF super-sampling algorithm. Flowchart 7E demonstrates the model compression system. In step 75000, a compression level is designated, either directly by a user, or from a predetermined configuration. The compression level is used to determine the resolution of a voxel grid constructed in step 75010, with smaller compression levels denoting a higher resolution voxel grid, and higher compression levels a lower resolution one. One skilled in the art will recognize that several open source programming libraries may be used to construct a voxel grid over a SfM model. In step 75020, a set of rays is randomly selected over the voxel grid and casted into the SfM model. One skilled in the art will recognize that ray selection occurs identically to a traditional NeRF system, but the operation of recording density and color values from casting into the three-dimensional model in 75030 is simplified. Where a traditional NeRF training session typically operates on two-dimensional images without any a priori three-dimensional information, such as depth, the three-dimensional SfM model has predefined ground truth values for the density and color along the ray. Instead of performing an integration along the ray, in the model compression case, the system needs only to query the color and location of the closest part of the model surface to the ray, eliminating a significant source of error that a traditional NeRF model would need to learn. Using the values in step 75040, a test view of the SfM model is rendered using the weights of the neural network, and compared to a ground truth view of the model using an error metric such as image PSNR in step 75050. The error calculated from 75050 is used to perform backpropagation in step 75060 to update the weights of the neural network. Steps 75020 through 75060 are repeated until rays have been cast through every voxel in the voxel grid. After step 75060, the neural network is fully trained, and its weights represent the compressed model. This model is then uploaded to cloud storage in step 71600.

Particular embodiments may repeat one or more steps of the example process(es), where appropriate. Although this disclosure describes and illustrates particular steps of the example process(es) as occurring in a particular order, this disclosure contemplates any suitable steps of the example process(es) occurring in any suitable order. Moreover, although this disclosure describes and illustrates an example process, this disclosure contemplates any suitable process including any suitable steps, which may include all, some, or none of the steps of the example process(es), where appropriate. Furthermore, although this disclosure describes and illustrates particular components, devices, or systems carrying out particular steps of the example process(es), this disclosure contemplates any suitable combination of any suitable components, devices, or systems carrying out any suitable steps of the example process(es).

Particular embodiments disclosed herein may be implemented in relation to different example use cases.

A single mission to be flown at a single location by a few drones. In this case, the 4D World 11310 is loaded with the location data and a single hive is in the Simulation 11320. The hive may have a human driver then take it to the new site. Then three drones may begin Preflight 11105. And then fly the missions without interruption. The drones will image information in Image and Drop 11150 and update the Hive Data Store 11240 which will update the Hive 3D Model 11250 and the Cloud 3D Model 11350. The Cloud will then provide that data to the Model Integration and Training 11370 system to update the 4D world model Then the drones with Land 11190 and then Next Site Module 11290 will route them to the next site for additional survey.

A city wide survey system that feeds multiple enterprises and can use drones from multiple sources. In this case a number of different operators may manually or automatically through Enterprise Integration 11260 create a large set of missions each with different privacy settings as may be monitored in the drone Privacy Check 11140 at imaging time and may be filtered out or encrypted in the model with Privacy Control 11380. The Mission Planner 11420 would aggregate available hives and drones from many different owners and operators into a single Mission Database 11450. The Optimizer would then simulate 11320 the entire multi-mission, multisite model and determine the best as may be measured in lower cost, meeting required accuracy and faster as may be weighted by different missions requirements. The Scheduler 11340 will dispatch multiple hives along distinct routes as specified in the Hive Plan 11205. As each hive Arrives 11210, they will deploy and calibrate 11220 each hive and then launch and calibrate 11110 drones as needed in various sequences and in parallel to minimize potential for collisions. Finally, the drones will form up into pods to accomplish their missions as specified by the Mission Executor 11130.

Model Compression for Low Bandwidth File Transfer: While three-dimensional model file formats tend to be incredibly large, often reaching sizes of several gigabytes, NeRF models are orders of magnitude smaller, as they only require the weights of the neural network to be stored. The model synthesis system disclosed in this patent may be used to allow for file transfer in bandwidth restricted areas. A file may be uploaded to the model compression system 6400, converting it into a NeRF representation. This smaller representation may be transferred across a low bandwidth network. The model decompression 6500 may run locally on the hardware receiving the file transfer, losslessly reconstructing the file.

Arbitrary Scale Virtual Reality Experiences: The model synthesis system disclosed in this patent may be used to reconstruct largescale, 1:1 representations of largescale scenes. Storing these representations with traditional methods may become prohibitively expensive to store at large scales, but model compression allows for cost effective storage at arbitrary scale, as the order of magnitude level compression eliminates disk space as a bottleneck. Further, since the system is agnostic to input devices and robust to the failure cases of both photogrammetry and NeRF, large teams may seamlessly collaborate to rapidly image and reconstruct large scenes with a variety of hardware. Small file sizes allow for operation in low bandwidth environments, as discussed above. One skilled in the art will recognize that methods for rendering SfM and NeRF models both may be easily applied to a virtual reality headset.

Underlying foundational concepts and terms of art relied upon may relate to one or more of the following: machine learning, deep neural networks, graph theory, UNIX-style operating systems, Von Neumann architecture, volume rendering, gradient-based optimization, and computer graphics.

Some of the issues faced by drones today include them being expensive and being manually operated (or programmed), and thus completing their mission(s) takes increased amounts of time. As an example, today there are approximately 300,000 Part 107 FAA certified drone pilots and a typical flying drone mission takes 15 days to a) plan the mission(s), b) actually flying the paths required, c) integrating the captured images into a 3D model and cleaning the artifacts, d) preparing the 3D models for use and/or sale, and e) ensuring that the appropriate regulatory and privacy rules were followed in taking the images. Some of the main problems faced today across the entire workflow of flying drones to gather images are that each stage is slow and requires significant manual intervention—this significantly limits the volume and quality of imaging that can be done today.

Figure 8A:
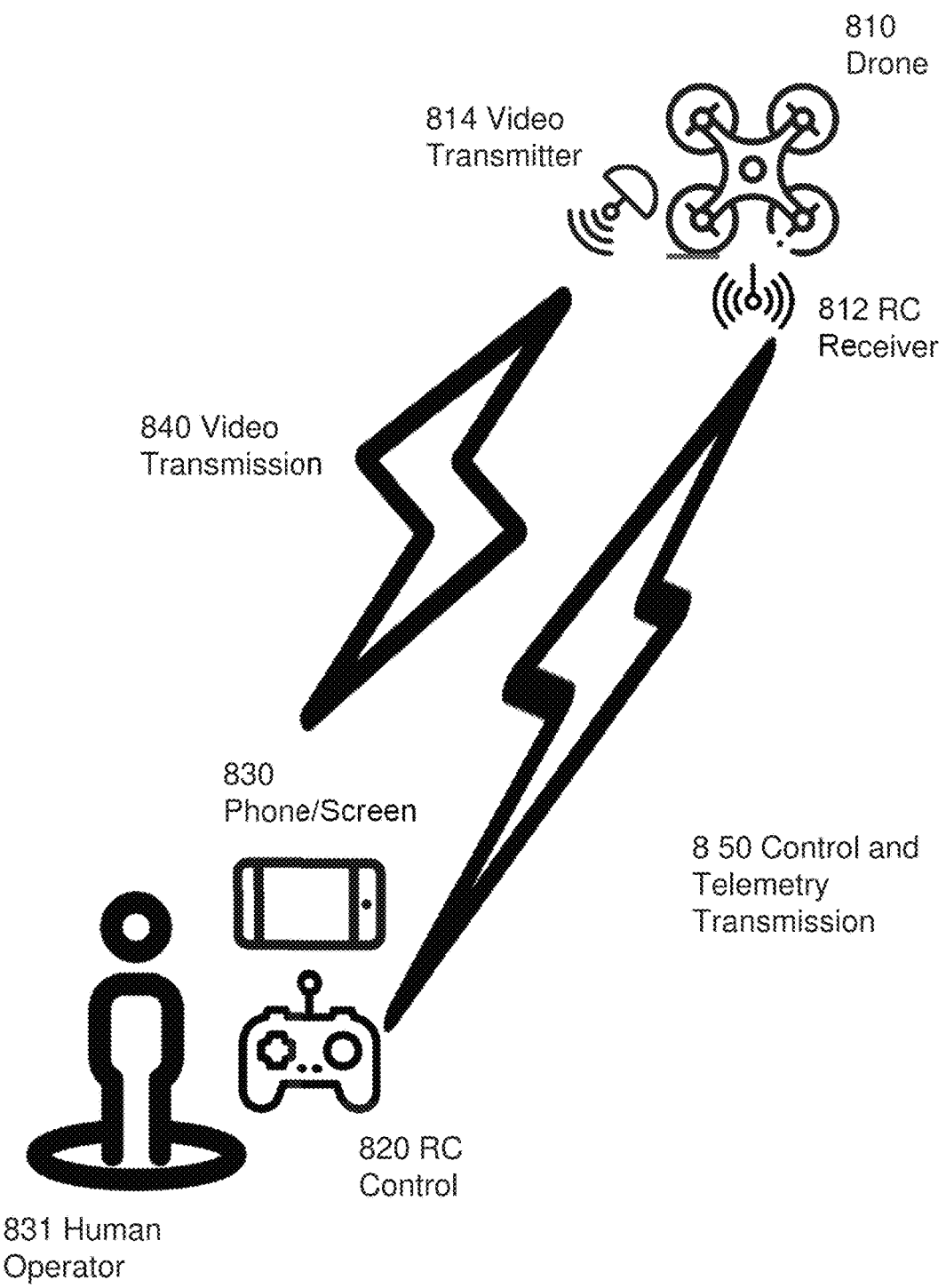
FIG. 8A is an illustrative diagram describing how a drone can be controlled, in accordance with various embodiments.

As mentioned above, problems with current drone hardware architectures results in drones that are complex in design/fabrication/operations, and that are navigation and error-prone. As an example, as seen with reference to FIG. 8A, system 800 depicts traditional control of a drone 810. Although a single instance of drone 810 is included within FIG. 8A, multiple instances of drone 810 may be included within system 800. For simplicity, a single instance of drone 810 is depicted. Drone 810 may include a receiver 812 to communicate a radio link 850 to an operator 831 via a manual controller 820. Drone 810 may also include a video transmitter 814 to facilitate a low resolution video downlink 840 to a display device 830. When drone 810 lands, a storage device may be removed or may be connected to a laptop to download data, such as high resolution sensor data, for further processing. For positioning, a global positioning system (GPS) may be used along with one or more cameras for imaging and obstacle detection.

Drones are relatively expensive costing 83100K for typical enterprise drones. They are typically deployed in small numbers due to the cost and the need to manually control each drone. Furthermore, because there are relatively few drones, they typically need to have a wide variety of sensors and be general purpose in nature.

Drones have to carry everything they need. Drones carry all the sensors needed for their operations, as well as compute and storage devices to locate and navigate through their environment. Drones are limited with respect to how much hardware computation they can perform based on the amount of compute and storage devices they can carry, and thus move with limited power available. As an example, a typical smaller drone may weight 900 g, may have a flight time of 30 minutes, and need 100 W of power to stay in flight. The limited power budget means that a drone cannot carry a 1 kg GPU system that draws 250500 W, for example, so for drone borne systems there are significant computational limitations that ground based systems do not have.

As a result, given the power and weight limitations, a drone's computational hardware is very limited and cannot run the most advanced artificial intelligence (AI) and other processing. The small size also requires more skill for programmers to write software for use with the drone and results in difficulty in testing and validating the software. Furthermore, when more capability is needed, the drones get heavier and more power hungry. If more AI is needed to recognize objects, a bigger processor is needed. If more detailed scans are needed, a heavier, bigger camera is used. A scan, which may be referred to herein interchangeably as a site scan or survey, as described herein, refers to a drone that moves in controlled manner through a 3D environment and, using a collection of red, green, blue (RGB), RF, LIDAR, ultrasonic and acoustic sensors, maps out the area in 3D space, contextually placing detected objects in the 3D scene. And more weight means more power and therefore bigger motors, more batteries, or other fuel. As weight increases, drones have more kinetic energy and have more and higher rotor velocity. If a longer mission time is required, the drones have to carry heavier batteries, which creates a negative cycle where heavier drones actually need more battery and have less flight time. Finally, because these single drones have to run standalone, they need to carry significant compute power for object recognition and must be capable of complete operation including return to home and other failure systems to prevent large heavy drones from damaging property.

Drones may rely on global positioning satellite (GPS) for positioning. In some embodiments, drone 810 may use GPS for position or for an optical flow to maintain position. In some embodiments, drone 810 may include an inertial measurement unit (IMU) and a compass to provide direction. The use of GPS makes drones difficult to use in GPS-denied areas, such as close to buildings or inside buildings. As a result, most drones have to fly far from imaging targets, which increases their weight and computational requirements for the sensor systems.

Drone communications are generally local, subject to interference, point-to-point and relatively slow. Drones today are commonly controlled by specific radio links, do not share or communicate with each other, and use traditional wireless technology. If too many drones are used in the same area, there may not be enough communication channels to send control signals or to achieve telemetry or video from them. Drone communications today are also synchronous (real-time) and must be reliable. In order to operate a large number of drones in various conditions, there needs to be a large number of frequencies available to prevent interference and communications can be lost if a drone loses line-of-sight to the controllers. Drones may also use satellite or cellular communications, but this requires large and power intensive transmitters to maintain signals.

Drones are generally not very fault tolerant. For instance, when deployed, if the drone has an issue, such as a failed motor, a fault with a camera, or a lower than typically expected charge, the drone will have to be recalled, a new drone found, and the mission rerun. If a backup drone is not available, the entire mission may be scrubbed and rescheduling of operators and others may be required. For mission-critical procedures, this can be life threatening if a mission is not run on time. Even if there are multiple drones available, losing a drone can require manual replanning of the mission to take over the parts of the mission that cannot be performed. Further still, if there are onsite operators involved, it can require communications between them, losing mission time as they work with each other to replan the mission manually.

Problems further exist with respect to drone software systems, as they may be limited software deployed at the edge, be non-uniform, procedural, and not AI-ready. The edge refers to computing devices placed between the system and the remote cloud, also often referred to as a local cloud solution. A local cloud refers to a dedicated cloud service that is managed by a third party and runs on-premises. A local cloud includes provisioning of physical infrastructure, software and full lifecycle management by the third party service provider. Edge computing is a distributed computing paradigm that brings computation and data storage closer to the sources of data. Drone programming today is very difficult because of hardware limitations listed above and to date most of the effort has been focused on flight control, keeping the drones flying and managing their limited power.

The limited software available at the edge means that it can be time consuming to write applications for drones, and the most advanced algorithms (e.g., which today may include artificial intelligence (AI) methods) generally require large amounts of processing power and storage, and can therefore not "fit" onto a drone. This results in less accurate and more error prone methods having to be used. Therefore, instead of modern software, more traditional and error prone procedural programming techniques are used to fit the hardware constraints, and these techniques fail to solve complex multivariable problems typically encountered in computer vision.

The non-uniform programming and procedural focus refers to the programming environment on a drone is radically different from programming of base stations and cloud computing systems. Thus, it can be difficult to move software between the hardware of the drone and other elements of the system, such as system 200. They do not offer a single uniform compute environment that allows moving software building blocks to the best place for speed and reliability.

The non-uniform user interface means that systems having dedicated planning software which runs on a PC for planning, software that runs on a smartphone for piloting, and then separate cloud software run through a browser significantly complicates the user experience and makes it difficult to maintain the software. Additionally, simulating and testing such a complex environment can be extremely challenging.

With respect to the drones not being vision-first and being 3D mapping focused, drones may operate in environments where GPS does not work and for processing reasons, the internal representations are primarily 2D. For example, because of limited compute resources inside drones, a full 3D representation is hard to manage inside a drone and the largescale requirements needed for full vision means that simplistic systems are used for object detection, object recognition, and 3D world navigation.

Current drones also may have workflow application problems, such as not being integrated, being 2D, being GPS dependent, and performing batch processing. Drones have followed the traditional flight model taken from manned aviation. With modern systems, an operator has to manage many complex tasks, from de-conflicting flights and monitoring battery status to stepping through a series of image processing steps and working with very different hardware in the drone, base station and cloud. Modern systems treat each task as a different software stack that must be learned and then the operator may hand integrates them to make the system work.

Another issue faced by modern drones is that they generally plan with waypoints using 2D maps. Today, flight planning is done with satellite imagery and uses a series of waypoints with instructions to the drone in terms of its mission. Waypoints rely on GPS information are can be unreliable at close distances as GPS is not reliable. Obtaining optimal reliability requires heavy, power consuming, and expensive additions, such as GPS real-time kinematics (RTK), which can still fail in urban areas where multipath reflections are prominent. RTKs refer to a GPS receive capable of performing "real-time kinematics," whereby normal signals received from current global navigation satellite systems (GNSS) along with a correction stream to achieve positional accuracy (e.g., less than 10 cm accuracy, 1 cm accuracy, 0.1 cm accuracy, or other accuracy measurement errors). Due to the inherent limitations of current GNSS technology, operators often perform manual missions and have to frequently take over manual control during automated missions, making these missions impractical and unsafe. In addition, mission planning does not take into account atmospheric effects and lighting conditions, all which influences imaging quality, including, but not limited to, which is not to suggest that other lists are limiting, shadows, obstructions, fog, or glare.

Modern drones may also have piloting problems. As human operators oversee operations, there is a limited in number of drones they can fly (typically 1:1 ratio is required for operators). Many of the steps require manual intervention, such as checking and planning made away from the site do not take into account the actual weather, shadows, and other problems that are present requiring manual intervention by drone operators. During imaging missions, low-resolution images are return in real time and the success of a mission may be determined after the high-resolution data is brought back and the data is downloaded or physically extracted from the drone.

Modern drones may also process data slowly and not in real-time. During missions, it may not be clear if the sensors are capturing the correct data. The time to convert images into usable data, such as 3D data, and the size of that data may mean it takes time (e.g., on the order of days or weeks) to prepare the resulting images for output and proper conversion. Additionally, the data for a single simple structure can require over 200 GB or 30 million data points, which is difficult to store and manage in the field while a drone is operating. This means that missions must be re-flown if the capture is inadequate or if additional data is required.

Having a real-time means to examine the 3D structure would dramatically increase productivity.

There may also be mission-level small scale operation problems, such as with accuracy, speed, cost, and dependability. For instance, the accuracy of the drone may be hindered because sensing processing is done after the fact. Processing is batch oriented after a mission has been completed and the results known. Therefore problems are missed or rescans are required. Additionally, because drones use generally use GPS for location, they need to fly high above structures to ensure good satellite contact, which reduces image accuracy or requires much higher quality sensors.

Speed and cost can also be problematic with the small scale of an operator coming to a single site to scan with a typically a single drone. Due to the operator using manual control of individual drones, a typical scan of a building can take hours to fly and then days to process the resulting sensor data. Modern drones are not suitable for scanning major buildings in minutes and many applications (such as continuous 24/7 scanning) are impractical.

Modern drones also have dependability issues, such as reliability, availability, maintainability, and safety. As drones are few in number, expensive, and have many sensors, there are many failure points that can cause a mission to be scrubbed. At the software level, scans are open loop systems without real-time feedback, where after a survey is completed it can be determined whether the imaging was properly done, and then the entire mission has to be rerun further reducing reliability. With a small number of complex drones, if a drone goes down, then the entire mission may be scrubbed. This drives expenses because multiple redundant systems are required. For instance, increasing the number of motors in a quadcopter to a hexacopter makes the drone more robust to mechanical failure. More complex drones also have more parts, which means more parts that can fail, particularly in the harsh outdoor conditions. Furthermore, safety (and/or regulatory) issues can arise as heavier drones inherently have more kinetic energy and typically higher terminal velocities. As an example with current Federal Aviation Authority (FAA) regulations, Category 1 drones, which are less than 250 g or not regulated at all and a Category 2 drone must have less than 12 foot-pounds of energy when it strikes something. It takes one second of free fall for a typical 0.9 kg drone to reach 20 mph which equates to 12 foot pounds limit for the FAA, so even small drones can be dangerous. Heavier drones are more capable, but since they can easily weight 1020 kg and a crash would be a very significant event. Drones are regulated as they are moving in the real-world. Ensuring compliance for both vehicles and operators is very important. In some cases, the vehicles may be electric vehicles (EV), which include terrestrial, aquatic, submersible, or airborne vehicles. Oftentimes simply making a drone very light or small will simplify regulations as does limiting whether a drone is beyond of visual line of sight (BVLOS).

Problems may also exist with modern drones in terms of fleet wide largescale operation problems, such as with scalability, interoperability, and security. Manual control and operation do not scale. The United States has over 5.6 million commercial buildings, 10 million industrial, 1 million public buildings, 2.3 million multifamily, 91 million single family homes, and 900 thousand bridges. These 100M+ structures need between 112 surveys every year. However, in the US today, there are 300 thousand operators, and automation must increase significantly to support the requirements for all these structures. To scale to planes, large improvements to enable a largescale systems are needed.

In terms scalability, the ability to control thousands or even millions of drones requires continuous imaging of the world in near real-time. Modern systems require far too many operators to make this possible. This scale level is limited because of testability and manageability problems. Testability problems and whole system simulation problems refer to large scale systems with drones that are difficult to continuously integrate and to continuously deliver (CD/CI) to ensure the entire system works properly. Current systems lack a general simulation environment for all parts of the system from edge to cloud. In terms of manageability, a single drone is relatively easy to track, but knowing the status of millions of drones, as well as handling logging and other events is difficult with current systems. In addition to the core scaling issues, modern drone systems are designed as standalone systems that typically have issues with interoperability and integration. For instance, many drone systems do not work with other hardware and existing drones so an upgrade requires many hardware changes. Furthermore, because each drone runs separately without broadband communications with respect to the rest of an enterprise, they work in batch mode. The drones do not directly integrate in real-time with enterprise databases or virtual communications systems. Further still, bad actors are a constant part of drone operations and current systems have security holes and lack privacy. For instance, most drone systems use proprietary protocols, and thus it can be is difficult to assess how secure they are and whether they have flaws that can be exploited. Losing control of drones or any part of the system would have significant impacts as these drones could be repurposed for malicious acts. Furthermore, when data is captured, it belongs to a single entity and it is difficult to share the information. There is no general marketplace or way to reuse survey information or even to determine what surveys and information has already been collected. Moreover, most drone today works as an "island" and do not share information and cooperate in a dynamic way. Drones that could cooperate would work faster and more accurately, thereby overcoming the aforementioned technical problems. In terms of privacy, drones can be intrusive and the ability to collect surveillance data from drones magnifies these problems even more. Modern drone system do not provide for systems that will prevent unlawful sensing from taking place or for locking of information so that only those with the right to see data can access it, or for preventing that access.

As with PCs, smartphones, and IoT, a dramatic cost reduction in drones is happening, which can change the way drones are used. A system that works for a 85,000 drone is very different from a system that uses 85500 drones. A system that relies on a small companion computer is very different from a system with 10× more compute per drone and 1001000× more computation in closely connected hives. This system may employ a multitier vision focused hardware architecture that runs distributed software systems that enables integrated real-time application workflow dramatically improving the accuracy, speed, and cost of drone missions and scales to thousands and even millions of networked drones working together.

Figure 3:
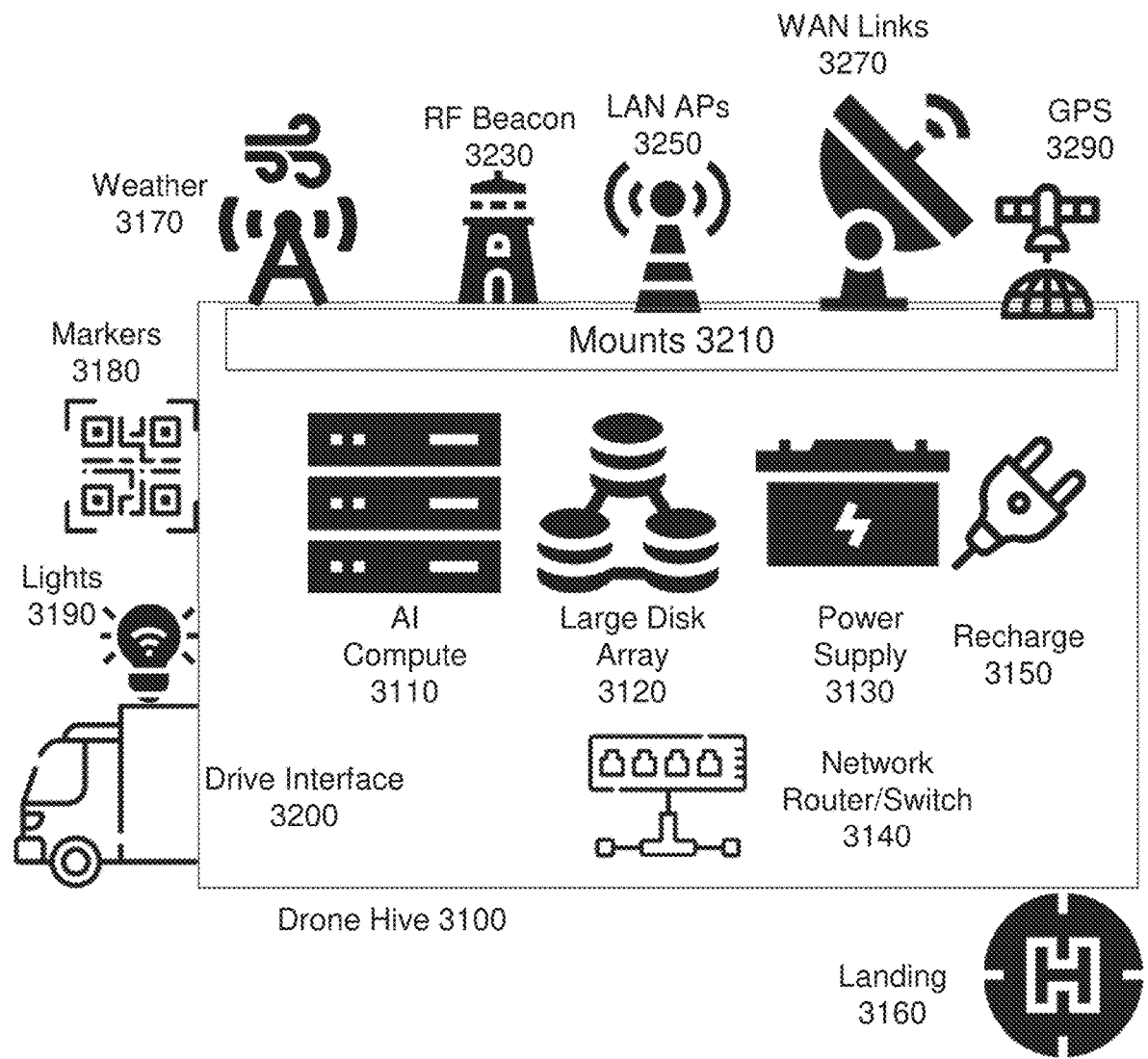
FIG. 3 is an illustrative diagram of an example hive architecture, in accordance with various embodiments.

FIG. 3 describes an example of a drone 300, in accordance with various embodiments. In some embodiments, drone 300 may be the same or similar to drone 810 included within system 200. The local communications network architecture of drone 300 may be a 3D dynamic local area network, instead of a static point-to-point network. A plurality of drones, such as multiple instances of drone 300, may act as nodes within the dynamic 3D wireless network to constantly communicate and map the radio frequency (RF) environment, dynamically creating an RF spectrum map used to optimize the flight trajectories to find the most efficient balance between flight time, network coverage, bandwidth, and communication latency.

Computing capability is performed on a base station, which is also referred to herein interchangeably as a hive, to augment drones. A hive, as defined herein, refers to a physical structure (stationary or mobile) providing processing, communication, and storage capabilities for data gathered by a variety of sensors, including, but not limited to drones, smart phones, wearables, and ground based sensors. Doing so moves heavy and power-hungry machine learning and 3D world modeling away from drones. In some embodiments, multiple hives may work together to create a large-scale local computing cluster with high speed communications to many drones. Furthermore, instead of putting GPS receivers on drones, some embodiments may include placing GPS receivers on the ground and may use RTK GPS or other positioning in combination with visual position so that each drone can precisely position itself. In some embodiments, local compute may connect to the highest tier with a 3D wide area network. Hives may constantly map the radio frequencies and bandwidth available to them and can reposition hives to better locations to provide high bandwidth to the cloud systems. In some embodiments, the cloud computing environment may be more closely integrated with the remote hardware at the mission site. This allows direct processing of real-time data and enables real-time collaboration while drones are in flight, thereby significantly shortening the time to analyze problems in the field.

In some embodiments, hardware architecture implemented by the drone systems described herein may dramatically increases AI computation by distributing it properly across drones, mobile hives, and the cloud. The hardware may be "vision first" because cameras are extremely low cost and when mated with advanced AI provide high accuracy even in GPS-denied areas. This can allow for closer imaging in unique areas with low-cost hardware. Some embodiments include the drone's design focuses on being ultra lightweight. For instance, drone 300 can be single purpose rather than multipurpose (although in some cases, a given drone may have two (or more) purposes). Flight time becomes a tradeoff with size and more drone computation capabilities (e.g., ten times that of conventional systems) can make for shorter flights by having many more drones. For example, a single drone with a 30 minute mission time may be replaced with 10 smaller drones with a 6 minute flight time and 10× more compute power in motion. Such a system would have (10 drones×6 minutes) 60 minutes of effect flight time and 100 times (10 drones×10× faster) the computation in motion. Within a single drone, the real-time mission critical flight controls may be isolated into a separate processor that may have a security gateway processor connected with a general-purpose computer. This isolates flight control and allows a rich environment for path planning, obstacle detection, and other programs that run above the low-level flight control.

The hardware architecture of the drone system described herein may use a large network (e.g., 10 or more, 1,000 or more, 100,000 or more, 1,000,000 or more, etc.) of small lightweight drones with separation of concerns that improve reliability and simplicity of programming. At the lowest level, instead of individual complex drones, the system may use inexpensive, single purpose drones that are simpler and low-cost.

To make these light drones as reliable and capable as larger systems, the drones may work together in a redundant array inexpensive drones (Drone RAID or "dRAID") so that if a drone fails, another drone can automatically take its place. A RAID refers to a data storage virtualization technology that combines multiple physical disk drive components into one or more logical units for the purposes of data redundancy, performance improvement, or both. These drone arrays may be further cost reduced by being specialized in function. Some embodiments may include some drones carrying one component and other drones carrying another different component. For example, some drones may carry cameras while other drones may carry lights or communication relays. This allows multifunction missions without the weight and cost of a large multipurpose drone, for example one that would carry cameras, lights, and communication relays. Missions generally may be performed by individual drones or a novel concept of a drone array. This logical layer makes it much easier to design planning systems. Instead of planning the routes of large quantities (e.g., 1 or more, 1,000 or more, 100,000 or more, 1,000,000 or more, etc.) of drones in a single optimizer, the system may provide redundancy at the virtual hardware level with dRAID and then plan missions treating a set of drones in a dRAID as a logical whole assuming fault tolerance is high in the array.

The use of drone arrays enables a hierarchy of virtualization from drone arrays to drone Kubernetes to drone no code. In this hierarchy, dRAIDs may be assigned units of work such as scanning a specific object, providing a uniform lighting of an object, or providing a communications network. Therefore, the system may be split into several parts that are much easier to program. On top of the drone array may be drone pods. Drone pods, which may also be referred to herein interchangeably as "pods" or "hives," are units of work managed by an orchestration system. The orchestration system may be configured to assign each software process to a container virtual environment. This allows a drone process to run on one or more drone pods that would otherwise be run on a single drone, in a drone array, or in a hive or a cloud. Some embodiments may include performing process migration in a drone fleet by separating the software process from the actual hardware. Finally, at the application workflow level, a No code intent system may be used in addition to a procedural programming system. With this system, a desired set of actions, such as imaging an object, can be specified, but the actual software process can be automatically generated through an optimizer, which may be AI-based or a classic linear optimizer.

The drones, such as a dRAID, may be launched, landed, and recharged from one or more drone hives. More than just a storage system, these hives may have a large compute cluster with AI accelerators used to provide even more compute capability to the drones. A typical graphical processing unit (GPU) accelerator may have more processing power (e.g., 10 times, 100 times, 1,000 times, etc.) than carried on a single drone. The drones may be sent instructions, perform object recognition, and create new paths from the hives. Hives may also be movable and may themselves be treated as RAIDs and pods.

As an example, hives may launch a series of drones for recovery by other hives that are downwind so that drones may float in the elements using less power. Hives may also act as partners to drones so the drones are not required to carry heavy and power hungry components, such as RTK GPS systems. The hives may relay critical information, such as location, to the drones making them more capable without adding to the drone's weight or power consumption needs. Hives may also act as beacons with passive and active markers, rulers in the visual, or RF ranges to provide positioning data for the drones. Computation can be moved from drones to hives or vice versa so that if a computationally expensive process has to be run, the task may be sent to a hive thereby lowering the drone's power requirements.

Drones and hives may themselves act as positioning and communication relay points. For example, when a drone is imaging, it may intentionally include other drones, hives, or other markers to provide positioning aids and feature points with known locations and characteristics.

To enable so many drones and hives to work together, the system may use a radiofrequency aware and agile local network, such as 3DLAN, that may connected by a high speed network. A 3DLAN refers to a Local area network (LAN) setup and is administered in 3D space where each node in the LAN corresponds to an entity capable of traversing 3D space through three degrees of freedom, six degrees of freedom, or some combination thereof. Drones may communicate with a 3DLAN configured to anticipate data needs and dynamically changes drone paths to fly into high bandwidth "hotspots" created in the sky. A LAN refers to a computer network that interconnects computers within a limited area such as a residence, school, laboratory, university campus or office building. By contrast, a wide area network (WAN) not only covers a larger geographic distance, but also generally involves leased telecommunication circuits. The 3DLAN may use standard internet protocols (IP) so that modern facilities, such as mesh networking, multicast, video streaming, or QoS, may all be available to the system. The system is designed to allow communications failures or outages. If communications are lost, the drones can continue to function until restoration improves drone availability.

Cloud computing may back the base stations via high-speed wide area networking 3DWAN that extends the 3DLAN concept to wide area communications. A 3DWAN refers to a wide area network (WAN) setup and administered in 3D space where each node in the network is an entity capable of traversing 3D space through three degrees of freedom, six degrees of freedom, or some combination thereof. The 3DWAN may analyzes the RF environment and position hives and drones in "bucket brigades" to ensure high bandwidth. As a result, drones have orders of magnitude more processing power and storage compared with standalone drones.

The software architecture may be fully distributed, uniform, and dynamic. The software architecture may isolate the detailed flight controls into a small contained module, and may use high performance general processors commonly available, such as those deployed in smartphones, in the drones to run the same compute container and networking protocols in the drone edge, local computer in the hives, and in the cloud.

The system may allow dynamic migration of functions such that if a connection is lost, the drones can continue to fly. Furthermore, when there is high bandwidth, functions can be offloaded into the hive or into the cloud. Instead of separate environments, some embodiment include the software providing the entire interface within a browser and separating components into microservices. Doing so can simplify the user experience and can make programming and testing easier. Furthermore, because the system is uniform, there may be a single uniform simulation environment that emulates the drones, the drone network, the hives, and/or the cloud together as a single system, significantly improving software productivity. Furthermore, the software may be vision first and 3D model centric.

The workflow may be built as an integrated whole rather that has a single vision built representation for the 3D world used in planning, piloting, and processing. Planning may be done with accurate 3D models of the world and without waypoints. Instead, the planning may be done using intentions, piloting may be done with pods of drones that accomplish missions rather than individual waypoint planning, and hardware failures may automatically be compensated for with dynamic planning. Processing can be done in real-time enabling real-time collaboration. The system can build 3D models with sensor data and can allow virtual cloud collaboration and dynamic changes in drone operation depending on what is found, all in real-time.

The aforementioned technical benefits may be obtained at small-scale, and the systems can be more accurate, faster, cheaper, and more dependable. Furthermore, the technical solutions described herein may allow for missions that are faster than those performed by a single manually flown drone. For example, in 9 minutes, a 64drone network can accomplish the same amount of scanning as a single drone scanning for 9 hours. The system may allow real-time creation of 3D models at planet scale and real-time virtual collaboration while drones are in flight, thereby facilitating real-time consultation improving decision making cycle times. Each drone may also be simpler and has fewer components than traditional drones, and can be highly available with automatic failover when drones fail or run short of power, more maintainable with simpler drones capable of returning home in the event of failures, and improve safety with lower mass drones moving and less powerful motors needed.

And at the largescale, the drones can be deployed in the millions (or at different scales). A single integrated system may be formed with direct oversight of the large fleets of drones from the cloud. Furthermore, automatic scaling may be enabled so that if a mission is taking too long, new networks of drones can be automatically assigned and moves as needed. Still further, with an integrated data storage system, the system can accumulate information for AI machine learning and training to improve, amongst other things, path planning, piloting, and processing of data.

Some technologies described herein may include, but are not limited to, which is not to suggest that other listings are limiting, robotic system technologies such as unscrewed air vehicles (UAVs), simultaneous localization and mapping (SLAM), robotic operating systems, motor controls, battery management, or other technologies. UAVs, referred to herein interchangeably as drones, refer aircrafts without any human pilot, crew, or passengers on board. UAVs are a component of an unmanned aircraft system, which includes adding a ground based controller and a system of communications with the UAV. SLAM technologies refer to the computational problem of constructing or updating a map of an unknown environment while simultaneously keeping track of an agent's location within it.

Machine learning and artificial intelligence techniques may include, but are not limited to, neural networks, visual transformers, back propagation, convolutional neural networks (CNN), and deep learning, which may be implemented using software packages such as Tensorflow or PyTorch.

Some machine learning and AI techniques may include computer vision technologies, such as photogrammetry, 3D model reconstruction, and Neural radiance fields (NeRF).

Some cloud computing technologies may include microservices, Docker and other container technologies, Kubernetes and other orchestration systems, cloud services, data caching and synchronization, and other technologies.

Some mobile technologies include Android architecture and AI acceleration. Networking technologies may include mesh networking, multiuser MIMO (MU-MIMO) and IP networking, 5G networking, and WiFi. MU-MIMO refers to a set of multiple input and multiple output technologies for multipath wireless communication, where multiple users or terminals, each radioing over one or more antennas, are capable of communicating with one another.

Hardware concepts may include redundant array technology such as used in RAID for storage, fault tolerant system technologies, and multisystem interconnects.

Programming environments and technologies may include intentional programming, JavaScript, no code technologies, or other technologies.

Web development technologies may include browser based computation, Web Assembly and web technologies.

Enterprise applications may include geographic information system (GIS) databases, 3D database and building information systems, and enterprise integration technologies, such as XML based connectors. GIS refers to a type of database having geographic data combined with software tools for managing, analyzing, and visualizing that data.

Blockchain technologies may include nonfungible tokens (NFTs), distributed ledgers, and off chain data storage. NFTs refer to a financial security consisting of digital data stored in a blockchain, a form of distributed ledger. The ownership of an NFT is recorded in the blockchain and can be transferred by the owner, allowing NFTs to be sold and/or traded.

Described herein is hardware and techniques for an array of drones, drone pods, local area networks, hives, wide area networks, and the cloud integration.

Described herein are drones and techniques for operating drones that can have extremely powerful replaceable companion computers which can compensate for relatively short flight times using a large number of drones working together. Such drones are inherently vision first with 360× 360 vision systems and AI accelerators. The drones can use the advances in the smartphone industry and other industries to form "flying phones" rather than a drone with a companion processor. Instead of multifunction drones, each drone may be lightweight with a simple mission, such as imaging, providing lights for better imaging, or for relaying communications. The drones may be designed to be lightweight and may have kinetic reduction systems such as parachutes or passive encasement to slow them down. These drones may also be designed with large slow-moving propellers that enable quieter and safer operation.

Some embodiments include the basic unit of work not being a single complex drone, but a dRAID of simpler lightweight drones having a single purpose (or minimal number of purposes) to further lower weight and power requirements. These arrays may be configured to allow any of number of drones to fail and still have the dRAID capable of continuing its mission. Having a reconfigurable drone array considerably can further reduce the burden on planning, piloting, and processing systems. Thinking of drones as arrays allows for an expensive custom build drone with every possible sensor and capability built at the factory (where most of the components are not used on missions and require a large power source to carry the extra weight) to be replaced with a drone array that can be tailored and assembled dynamically for every mission based on the mission's requirements. Further still, each component may be an independent drone, which can be lighter, simpler, more reliable, and less expensive than current drones. With a dRAID, deadweight in the system can be minimized. For example, if a narrow view is needed, a small number of camera drones can be used. As another example, if the drones are needed for a short mission, small battery drones as opposed to larger battery drones can be configured.

A dRAID may operate faster because of its use of a single camera. Multiple cameras on multiple drones may instead be used to take images simultaneously, allowing for fast interpolation and higher accuracy than conventional techniques. The dRAID may allow hot spare drones to automatically move to become part of the array in the event of failure. An array of redundant drones, such as a dRAID, can also reduce regulatory hurdles as lighter drones have less kinetic energy and improved reliability (for example, if a drone fails, other drones can take over).

There can be multiple types of drone arrays including multiple drones or dRAIDs doing different tasks that further simplify the drones' scheduling and lower the cost and power needs for the drones. For instance, there can be a dRAID of imaging drones, an array of lighting drones to eliminate shadows, an array of communication relay drones if the LAN or WAN coverage is poor, or other array types.

Within an individual drone array there may be many different types of drones. This can increase management flexibility so that if there are different requirements for sensing and directions, different types of drones, such as a lighting drones, three camera drones, and/or communications drones, can work in the same system to make the logical "drone" created by dRAID even more flexible.

In some embodiments, dRAIDs can be managed locally so each drone positions itself relatively to the rest of the drones and they collectively agree on their state. Arrays may also be managed by one or more controller drones, which may include multiple drones configured to direct the movement and position of subsidiary drones. Furthermore, a drone array may be virtual such that each drone works independently, but the piloting software emulates the drone array. These implementations can be flexible depending on how much compute power is available in the physical drones. For example, a drone array may have a great deal of computational power so that each drone can maintain the state of all other drones to manage themselves as peers. As another example, if a few drones have a great deal of compute then the drones can manage the entire array as secondary drones taking path information. Further still, if the drones do not have enough compute power, the array planning can be done in a remote controller, such as one or more hives, offloading the individual drone computations to the hive.

Some embodiments include treating drones not as individual sensors, but as a single camera system managed with a single global 3D shutter. When an object needs to be imaged, multiple drones may fly either in a drone array or as individual drones that are synchronized with precise timing to take an image (or images) from multiple vantage points at the same time (e.g., within 1 second of one another, within 0.1 seconds of one another, within 0.01 seconds of each other, and the like). This single global shutter for an image can allow a precise 3D model to be created without artifacts that occur when photos are stitched together over time.

Some embodiments include local communications systems that are dynamic 3D local area networks instead of a passive network that is point-to-point. The drones and hives can constantly recompute the RF environment, mapping hot spots and measuring the communications needs, and all nodes can automatically move to locations as needed to maximize bandwidth. This reliable system enables smaller drones to replace larger more complex ones.

Some embodiments include the computing being in local compute clusters in hives instead of in individual drones. This moves heavy and power intensive machine learning and 3D world modeling away from the drones. The overall system is capable of operating with compute on the ground and sensing in the drones. Multiple hives can work together creating a largescale local compute cluster with high speed communications to many drones. Furthermore, instead of putting GPS receivers on drones, they can be placed on the ground, and can use RTK GPS or other positioning in combination with the visual position so that each drone can precisely position itself.

The local compute can be connected to the highest tier with a 3D WAN. The hives may constantly map the radio frequencies and bandwidth available to them and can reposition hives to better locations to ensure high bandwidth to the cloud systems.

Furthermore, the cloud computing environment can be closely integrated with the remote hardware at the mission site. This may allow direct processing of real-time data and can enable real-time collaboration while the drones are in flight, which can significantly shorten the time to analyze problems.

Some embodiments include software that is novel in structure at the edge, implements a uniform programming environment, and is vision and AI first. The on drone systems may be containerized and may use standard IP protocols. Software running on the drone can automatically migrate from the hive to a drone or from one drone to another. Some embodiments include a general compute node rather than specialized flight software.

Uniform programming models exist across the drone, hive and cloud so that a single development effort can apply to any of the hardware environments and it enables much simpler simulation and testing. Drones may be programmed with intentions rather than waypoints and procedures. Drones or drone arrays (which improve redundancy and simplify programming) may be managed as pods of functions. Orchestrated together, the drones may operate as one to perform a mission rather than following a series of waypoints, thereby simplifying the programming into generating the intentions or the desired state of the system and then having an orchestrator separately work to maintain that state.

The fundamental unit of work may include a set of points to be imaged rather than a specific plan. This separates the actual path planning details from the points that must be imaged and allows automatic failover and replacement as needed.

The software facilities may be vision first and 3D mapping focused. The native primitives in the system include building a 3D view of the world in the hive that is shared with all connected drones and then augmented by additional recognition and enhancement that can be done in the non-local cloud.

Some embodiments include a user interface that is browser based. A browser based user interface can separate the presentation of the data from the infrastructure in the hive or the cloud that is processing the data.

Some embodiments include the application workflow being significantly enhanced as it merges together the traditional manned aviation view of drone operations and automates it. Planning may be done with a 3D map rather than just 2D satellite and may use realistic 3D visual effects from computer graphics engines so that planning takes into account shadows and glare and other real world effects. Plans may be created assuming multiple drones acting together in a pod to accomplish missions (for example, so waypoints are not used for individual drones), but a "no code" approach can also be used for a drone pod that has a set collection of locations to image.

Piloting does not have to be an extension of manual piloting. A 3D map can be built using visual cues and may not be dependent on GPS, all the drones in the system, and can be shared amongst all drones. The drones can find each other in images and find known objects, such as hives, to position themselves. For example, the drones know the exact size and physical features of each other, which aids in positioning. Failures and problem with drones can be handled automatically as is replanning of drone flights.

Some embodiments include processing of images in real-time using high speed transmission afforded by the drone array and caching in the 3DLAN. Reconstruction of 3D images may use NeRF and/or other AI techniques to generate 3D models and perform object recognition. The results can be immediately shared with the operator. In some embodiments, the cloud system can assist in this and also in the real-time transmission of models to remote users. The cloud system may also allow both remote conferencing and changes in flight plan.

Some of the technical benefits of the embodiments described herein relate to the hardware, software, application workflow, and the resulting small-scale permission overall result. Additional technical benefits are described with respect to improvements to the overall largescale fleetsize.

Some of the technical benefits of the hardware described herein may be noticeable at the drone level. For instance, drones may be produced that are cheaper, safer, and disposable compared with complex drones. For example, a 249 gram drone is not considered dangerous by the FAA and therefore has substantially fewer requirements. Furthermore, adding automatic airbags and other technologies can facilitate drones capable of floating rather than falling in flight.

At the hardware level of multiple drones in an array, the embodiments described herein can improve the drones reliability and speed of operation. For example, two 249 gram drones with two cameras will image an area twice as fast and is not subject to FAA regulations. Additionally, if one drone fails, the mission is not scrubbed but can continue with one or more of the remaining drones taking over the missed points. Having a high performance 3D LAN provides orders of magnitude more bandwidth to the drones, which allows them to offload more processing to the hives thereby further reducing weight. Additionally, knowing when high bandwidth will be available through the 3D RF imaging of the LAN enables rapid download and transmission of information at high fidelity. At the hardware level of drones with hives, the system described herein has a substantially better overall 3D map of the area being surveyed and can, in real-time, determine what areas have not yet been surveyed or need additional surveys. The compute power in the hive resides in something with significantly more weight and power capacity, so larger processing and storage systems, as well as GPS location technology, can be on the ground, resulting in better accuracy, faster processing, and faster sharing of information across all the drones. Furthermore, at the hardware level, having a broadband network that is monitored and maintained in real-time can bring much closer connection to the cloud, further providing more computation capabilities for better mapping and object recognition from datacenter scale resources.

At the software level, some embodiments described herein may use lightweight drones with high-performance computers to homogenize the computing environment. This may allow more code to be shared between the drone, the hive, and the cloud, further speeding development. At the software level, some embodiments may use orchestration to separate the intent of the operation, such as scanning from the actual implementation, makes programming and managing many drones easier by dividing the problem between the intent to scan and the physical resources through orchestration. Therefore, the application programmer does not need to worry about how something is done, just what must be done. Also at the software level, some embodiments include separating the computation into microservices that run in virtual containers. Running the microservices in virtual containers may allow the system to automatically migrate processes in containers between the drones, hive, and cloud, which may allow the system to dynamically adjust where the computation happens depending on the local network between the drone and hives, and the wide area network between the hives and the cloud. For example, if the LAN is high quality, more of the computation can happen in the hive reducing the load on the drones giving them longer flight times as an example. At the software level, some embodiments may use browser technology, such as Web Assembly and 3D GL, which may allow the system to put the user interface into a browser. Putting the user interface into a browser can significantly reduces the learning curve for users and can also simplify the development process. The user interface can call the microservices in the system, bringing drones fully into the modern internet world. Still further, in some embodiments, the software architecture may be vision first and 3D mapping focused, which can simplify the application workflow significantly. For example, instead of dealing with low level primitives, the system processes camera and other sensor data into a rich 3D world, thereby making it easier for the application workflow developer.

At the workflow level, some embodiments include simpler mission planning because the guesswork is eliminated trying to do 3D planning with 2D satellite maps. Further still, because the system can use realistic 3D gaming engine modeling of light, wind, or other physical effects, the planner can take into account these important effects when determining where and how to image an object. Rather than specifying what to do, the system can be configured to describe the intention or the desired state. This "no code" approach enables users, who are better at describing the state desired (e.g., "I want a survey to 1 cm precision") instead of manually specifying several waypoints. However, this technique requires significant engineering efforts to make work on a single drone. At the workflow level, some embodiments further include actually piloting the mission based on 3D models and drone pods to significantly reduce operator workload. For example, it may be easier to monitor the status of many drones by seeing where they are in a 3D map of the mission site. Also, operators can examine the real-time data feed of the drones inflight rather than waiting until after the mission is over. In the processing step of the workflow, some embodiments include the real-time capability such that problems in scanning can be detected while the mission is in progress. Furthermore, because the system uses advanced 3D compression techniques, a latency associated with seeing these models in real-time and transmitting them can be reduced.

Taken together, these hardware, software, and application workflow improvements considerably improve the accuracy, speed, and cost of a drone mission. Additionally, these improvements can significantly increases the dependability of the system with improvements in reliability, availability, maintainability, and safety. For instance, separating the flight, safety, and applications hardware and systems can significantly improve reliability. These can also be assign dedicated communications so that a problem in the application layer, such as mission planning, may be minimally impact flight and safety systems. Also, by using smaller less complex drones, there are fewer items subject to failure. In particular, redundant arrays of drones of different types and base stations can increase the overall reliability of the system because each of them has a simpler single function. Multirole systems of N components can have $N^2$ more ways to interact and fail. The availability may be improved because of the ability to have "failover" drones and overlapping coverage, as compared to systems including a small number of complex drones. In the latter case, if a drone goes down, then the entire mission may have to be scrubbed. However with the use of failover drones and overlapping coverage, an operator can tune the requirements to tolerate any number of drones failing. The maintainability may be improved because more complex drones, which have more parts that can fail (particularly in the harsh outdoor conditions where drones are used) are not needed or can be replaced with smaller, simpler drones with fewer parts capable of failing. The safety of the system can also be improved because the sizes of the drones and the kinetic energy of the drones is less than those of more complex and larger drones. For example, although the system can be used with existing "heavy" small unmanned aerial vehicles (sUAVs), ultralight drones, such as those in the sub 250 gram category, have inherently less kinetic energy. Therefore, the terminal velocity due to wind resistance or auto rotation may be comparatively low. With these techniques a small drone can have essentially zero kinetic energy and may "float" when/if it fails.

Furthermore, from a largescale fleetwide view, for achieving Internet scale, some embodiments described herein employ an overall system that can significantly increase manageability, interoperability, programmability, and scalability, as well as improving privacy and security. With respect to manageability, some embodiments use a hierarchy of base stations and drones, simplifying management. For example, instead of thousands of individual parameters, grouping the drones into arrays and networks allows a group to be managed and controlled at that level. For instance, a task to image can be assigned to a drone array and that system issuing the directive does not have to manage the number of drones failures and repathing that is required when obstacles are encountered. With respect to the interoperability, the system may allow any drone to be integrated into operations. For example, the technical solutions can be software for an existing fleet and the drone management software. With respect to the programmability, some embodiments include simulating the system using conventional systems. For instance, because the key data components may include a 3D world model and a layered model, any level can be simulated. As an example, a drone mission can be run against a 3D world model, instructions can be generated to simulate hives traversing that world, and then drones can be deployed in the simulation. Individual modules can be easily tested just by simulating the systems above and below. In addition, by using a declarative language, complex path planning can be handled at the lowest level, thereby considerably simplifying a programmer's workload. Some cases include the system being trained using real-world missions. For example, machine learning can be applied by taking similar missions and seeing what actions actually work. With respect to scalability, some embodiments include a system that is designed from the ground up to work with thousands of drones in a single mission and to handle a mission like this with the same infrastructure that works across millions of drones through the layering of concerns approach. That is, each level can take a declarative description of the state the higher level desires. For example, the mission planner just says "Image this house at 1 cm resolution with 10 drones" and this means that the actual path planner is decoupled and can be replaced and managed separately. In other words, the complexity of the system can scale linearly. With respect to security and privacy, some embodiments include privacy being built into the system (for example, from how it images to how it reads system data), inherently making the system more secure. For example, having the ability to revoke 3D object access enables to the system to respect GDPR. For instance, if an individual is recognized, that individual may control the access rights via an NFT that is their identity across the entire system. They can also revoke access as needed.

The system described herein may be simpler for end-users to operate and use correctly. For instance, with respect to simplicity, having a layered system can enable different specialists to work on different parts of the system. As an example, a mission planner does not need to worry about the maintenance functions or the possibility of a drone not being ready. Instead, when a drone is out of service, the mission planner may specify the resources required and the resource schedule allocates the actual hardware. Also, because the main interface for data output can be a 3D world model, some embodiments include a single uniform way to read the data and write into it. Further still, connecting different surveys through NFTs and a distributed ledger may enable users to use an easy to understand market rather than complex business negotiations to purchase data. Rather than specifying what to do, some embodiments enable the intention or the desired state to be described. This process can be referred to as "no code," as it allows users to describe the state wanted (e.g., "I want a survey to 1 cm precision than in specifying many way points"). In some embodiments, human can declare what they want and computers can run an optimization to move from the current state to the desired state. This minimizes the amount of error prone procedural logic in the system, reducing bugs and other problems.

Additionally, with every mission run there is an opportunity to improve the system by automatic learning from previous missions. Everything from RF models to path planning can have a continuous feedback loop between the actual execution in the physical world and the simulated world.

Architecture

The overall system architecture, which may include multiple drones, multiple base stations (hives), and the cloud are described in detail below.

Figure 2:
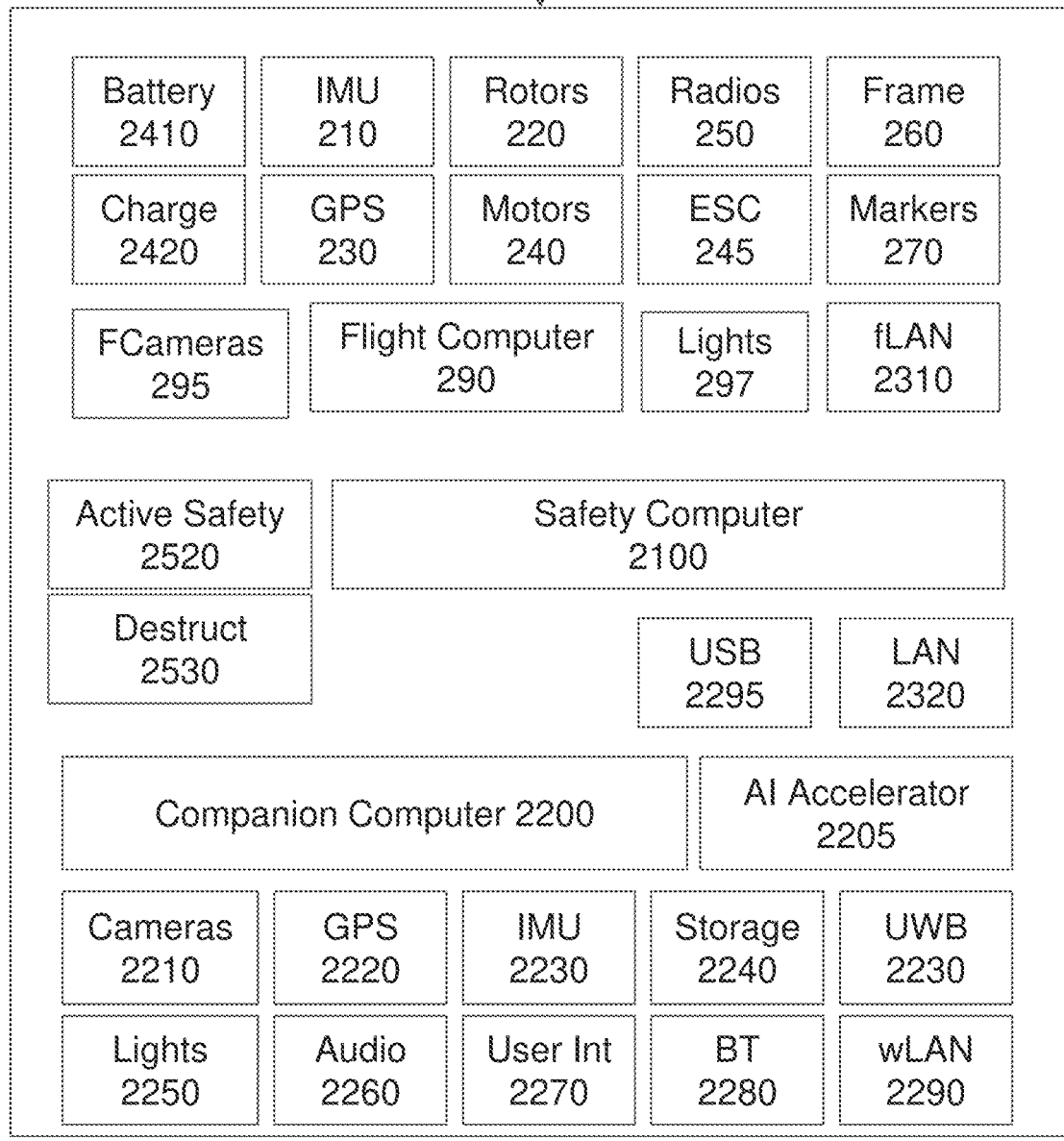
FIG. 2 is a schematic diagram of a drone, in accordance with various embodiments.

FIG. 2 is a schematic diagram of a drone 200, in accordance with various embodiments. A single drone, such as drone 200, may include a battery 2410, an IMU 210, rotors 220 (one or more, two or more, four or more, etc.), radios 250, a frame and landing system 260, a charge system 2420, a GPS 230, motors 240, electronic speed control (ESC) circuitry 245, markers 270, FCameras 295, a flight computer 290, one or more lights 297, fLAN 2310, active safety system 2520, destruct system 2530, a safety computer 2100, one or more USBs 2295, LAN 2320, a companion computer 2200, an AI accelerator 2205, cameras 2210, GPS 2220, IMU(s) 2230, storage 2240, ultrawide band UWB 2231, lights 2250, audio 2260, a user interface 2270, a Bluetooth (BT) 2280, and wLAN 2290. Although a single instance of each of the aforementioned components is depicted within FIG. 2, persons of ordinary skill in the art will recognize that multiple instances of some or all of the components may be present within drone 200, and a single instance of each component is depicted to avoid obfuscating features.

Companion computers, as described herein, refer to one or more computing units capable of additional perception, communication, and sensing, and which can be connected to the main flight critical autopilot either through a wired or wireless connection and may be networked.

In some embodiments, flight computer 290 may be configured to perform low level control of the actual operation of drone 200. IMU 210 may be configured to provide compass, accelerometer, or other movement data. GPS 230 may be configured to report location. Radios 250 may refer to a telemetry radio, which may be configured to provide movement instructions or instructions for flight. In some embodiments, motors 240 may be actuated to power rotors 220 using ESC circuitry 245 to keep speed consistent. Drone 200 may further include frame and landing system 260, as well as various visual markers 270, such as QR codes or calibrated length measures. In some embodiments, drone 200 may include one or more sensors, such as Fcameras 295 or other sensors such as Lidar, and may have navigation lights 297. Lights 297 may be configured to flash patterns to signal. Drone 200 may further be connected to other systems with a flight LAN 2310 or serial bus.

Safety computer 2100 may be configured to isolate the mission critical flight hardware from companion computer 2200. Safety computer 2100 may be configured to monitor data requests and flows, and can restrict companion computer 2200 in the event it is determined that companion computer 2200 is not functioning properly. Safety computer 2100 may include active safety devices 2520, such as parachutes or inflating balloons designed to lower the speed in case of failure and may encase rotating or sharp parts. Further still, safety computer 2100 may include a destruct system 2530 configured to turn drone 200 into components that have less kinetic energy or fewer sharp objects in the event of failures.

Companion computer 2200 may include AI accelerators or GPUs 2205 to improve neural network performance, a sensor payload 2210 of one or more cameras, lights, or other sensors configured to provide imaging of the surrounding environment, IMU 2230 and GPS 2220 configured to provide base location information, compass, accelerometer, or other data relating to a physical location of drone 200, and storage 2240 for storing programs and data. Companion computer 2200 may also include a user interface mechanism 2270, such as a touchpad and screen, and may be configured to communicate with other modules on drone 200 through a LAN 2320, USB 2295, or other communications systems. In some embodiments, drone 200 may include an ultrawide band 2230 and/or BT 2280 for proximity sensing and local communications. Drone 200 may also include wLAN 2290 implementing technology that is cellular, WiFi, or other protocol based, or combinations thereof. These antennas may both send information and passively record the signal strengths as the drone travels enabling mapping of the 3D environment.

In some embodiments, drone 200 may also include charging circuitry 2420 for batteries 2410, and attachments for active safety 2520, such as airbags, balloons, and/or parachutes, as well self-destruct hardware 2530. Drone 200 may include a lighting system 2250 for identification and visibility and an audio system 2260, which may include one or more speakers, one or more microphones, or other audio input/output components. Some embodiments include USB 2295, or other serial connections, to attach additional peripheral devices.

FIG. 3 is an illustrative diagram of an example hive architecture 300, in accordance with various embodiments. Hive architecture 300 may include (drone) hive 3100 as well as one or more landing or takeoff systems. In some embodiments, the landing/takeoff systems may be used with passive visual lighting, active lighting, or RF beacons to allow drones to localize landing site 3160 and may include recharge 3150. Recharge 3150 may be configured to automatically connect to a drone (e.g., drone 200) when the drone lands. Recharge 3150 may be further configured to charge the drone upon recharge 3150 connecting to the drone.

Hive architecture 300 may include one or more markers 3180, which may be static optical or lit in a pattern. In some embodiments, hive architecture 300 may also include multiple lights 3190 allowing blink patterns to aid in localization. In addition, hive 300 may include multiple RF beacons 3230, such as Bluetooth LE or UWB that provide precise localization on the various part of hive 300. In some embodiments, hive 300 may have markers, such as QR codes, to calibrate measurement rulers as part of any of these systems.

In some embodiments, hive 300 may include one or more LAN access points 3250 that may cooperate to produce MU-MIMO, thereby allowing multiple streams to multiple drones simultaneously. In some embodiments, hive 300 may include one or more wide area network links 3270 to the cloud, such as a satellite or cellular modem. Hive 300 may include one or more GPS receivers 3290 that may be high precision using differential GPS or RTK. These antenna systems may be attached or separate or placed on separate positioning mounts 3210 that may themselves be autonomous and movable (to obtain the best signal). In some embodiments, hive 300 may include AI Computer 3110, which may include a disk array for storage 3120. Hive 300 may also include a power supply 3130 for the hive itself and to recharge drones, such as via recharge port 3150. In some embodiments, hive 300 may include the network switch and routing hardware 3140 to connect these components. Network switch and routing hardware 3140 may be intelligent and capable of handling multiple connections upstream to the cloud or other drones and to individual drones. Hive 300 may also include recharging for the drones and also for the onboard power systems. In some embodiments, hive 300 may be autonomous and may include an input to a drive interface 3200 of a vehicle 3100 to enable movement of the entire hive.

FIG. 4 is an illustrative diagram of an overall system 400 including one or more drone pods 410, in accordance with various embodiments. A drone pod 410 may include a collection of one or more drones, such as drones 420, 430, 440, 450, etc., which may operate as a unit and perform missions together for planning purposes. Each drone pod 410 may have different functions, so that drones 420, 430, 440, 450 may communicate through a Drone LAN 4300 created by one or more Hive LAN Access Points 4100. System 400 may include one or more hives 4200 that may be connected to one or more drone wide area networks 4300. Drone pod 410 may have include cameras, lighting devices to illuminate shadows, LIDAR, radar, audio, or other sensing devices. These pods may connect to one another via WAN 4300 and to cloud services 4400. Cloud services 4400 may be hosted remotely and may include services such as computer services 4410, storage services 4420, networking and routing services 4420, or other services.

Figure 5:
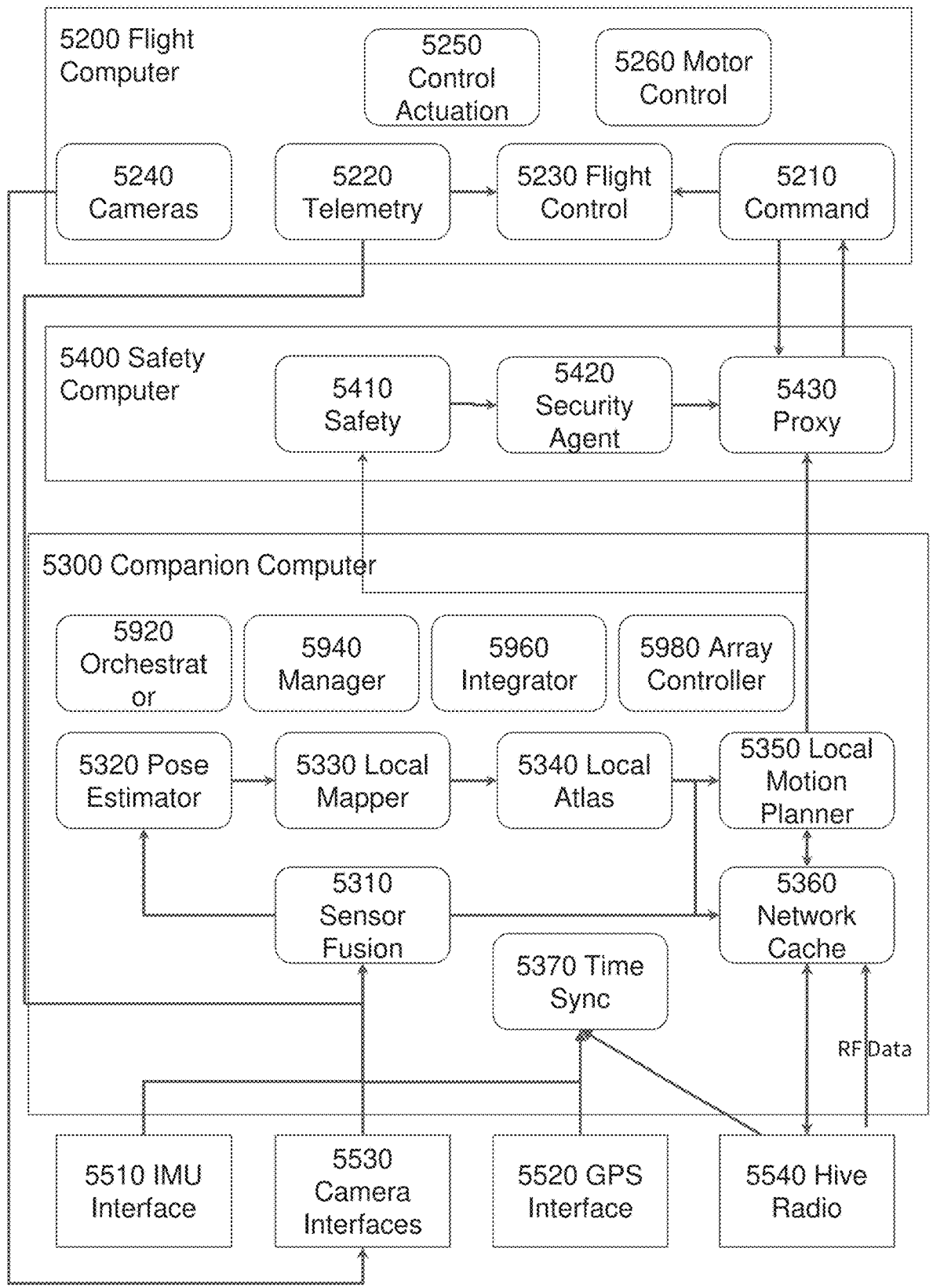
FIG. 5 is a schematic diagram of drone software architecture, in accordance with various embodiments.
Figure 6:
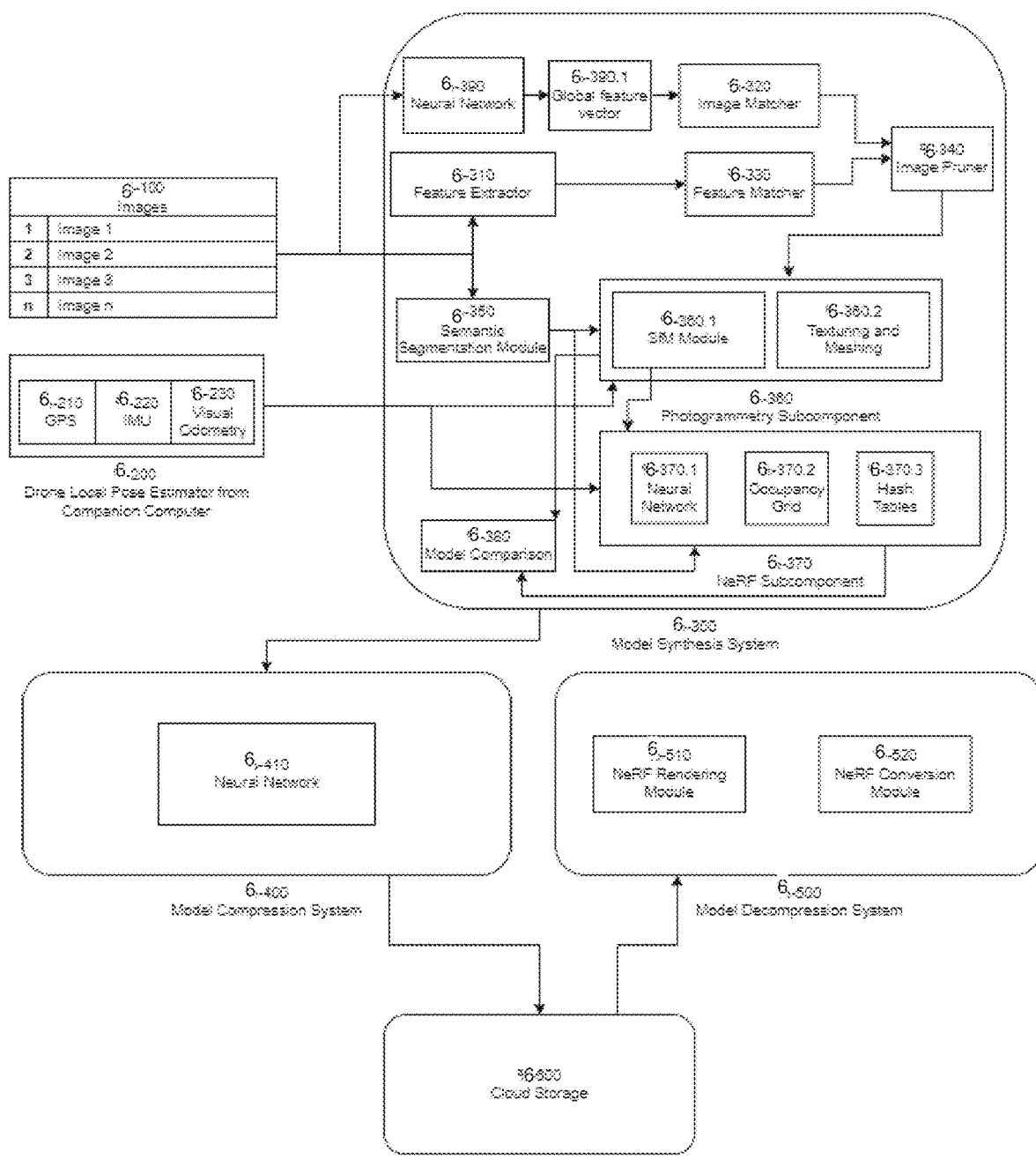
FIG. 6 is a functional block diagram of an exemplary system for model synthesis.

FIG. 5 is a schematic diagram of drone software architecture 500, in accordance with various embodiments. Hardware architecture 400 may run software blocks.

Drone software architecture 500 may include one or more instances of a flight computer 5200, which may be configured to control low level systems. Flight computer 5200 may be configured to operate one or more of modules. For instance, flight computer 5200 may include a camera processing system 5240. Flight computer 5200 may include a telemetry system 5220 configured to records the IMU, motor state, and/or other flight data, such as apparent wind. Flight computer 5200 may include a flight control module 5230, which may be configured to convert flight commands stored in command module 5210 into detailed operating commands for flight control actuators 5250 and motor control software modules 5260.

In some embodiments, a drone may include one or more instances of a safety computer 5400, which can be configured to monitor commands. Safety computer 5400 may include a safety control system 5410 configured to monitor the state of the drone, initiate emergency actions, such as to return to home, self-destruct, or depowering of the system, or the firing of parachute or other safety systems. Safety computer 5400 may include a security agent 5420 that can be configured to validate commands going to command system 5210 to ensure commands are valid and from valid software in the system. Communications between the flight computer 5200 and one or more proxy modules 5430 that can be configured to monitor, and potentially block, network transfers between computers.

In some embodiments, the drone may include one or more instances of a companion computers 5300 that may have their own software modules configured to monitor IMU information from IMU interface 5510 and telemetry information from the telemetry modules 5220 or one or more flight cameras 5240 via camera interfaces 5530. In some embodiments, the drone may have one or more GPS interfaces 5520 and one or more sensor interfaces. In some embodiments, the drone may include one or more sensor fusion systems 5310 that can be configured to process, clean, and merge the information. This module may send information to pose estimator system 5320 to estimate the 6degrees of freedom (DoF) pose of the drone to determine its position in space both relative and absolute in the world. A pose refers to a position and altitude, where the position may be presented in either local or global coordinate system reference frames. One or more instances of pose estimator software modules may feed one or more local mapping modules 5330, which may be configured to determine the location of objects in the world and determine if there are obstacles and the navigable path for a specific drone. One or more local mapping modules 5330 may be configured to connect with one or more local atlas modules 5340, which may be configured to determine the position of the drone in global space and may determine if the drone has made a loop and has arrived at an already seen location. This information may be sent to one or more local motion planner systems 5350 that can take into account the current position, the current state, and the desired mission plan to find the optimal path for the drone. The local motion planner system 5350 and sensor fusion system 5310 may forward images, pose, and other information to the network cache 5360 for transmission to one or more hives through hive radio system 5540.

In some embodiments, local motion planner system 5350 may be configured to receive updates over hive radio 5540 from the hive providing additional information such as additions to local mapping module 5330 or local atlas 5340 based on other drones or other hive information. Local motion planner 5350 may keep track of its relative position to other drones to maintain a drone RAID array and ensure it is a set distance from other drones in the array. There may be a local Array Controller 5980 to do additional management such as fault recovery and configuration that may work on the drone or other drones in the array.

As the done travels, it may collect RF signal strength data from the hive radio 5540, and other sensor information directly such as IMU information from IMU interface 5510, GPS information from GPS interface 5520, image data from camera interface 5530 or cameras 5240, or telemetry data from telemetry system 5220. This information may be sent to hive-wide planning.

Drone Time Sync module 5370 may synchronize its clock from various sources including timing information from GPS interface 5520, and may receive time corrections from the hives over Hive Radio 5540. Drone Time Sync module 5370 may provide services and precise time stamps for all sensor systems and transmission. Drone Time Sync module 5370 may also be used by the Planning modules to more precisely determine mission and travel times.

The drone software processes can be kept in containers and the modules may be kept in companion computer 5300, and they may be managed by orchestrator 5920, which may be configured to determine which modules to run on which components of companion computer 5300. Orchestrator 5920 may communicate with the hive to migrate pods from the companion to the hive if there is too much work to be done. The overall management of companion computer 5300 can be handled in manager 5940, which may include a user interface, statuses, logging, and other information. Integrator 5960 may provide an interface to external software that may run on the drone and provides an integration interfaces for foreign software that may extend the function of the system.

Figure 8B:
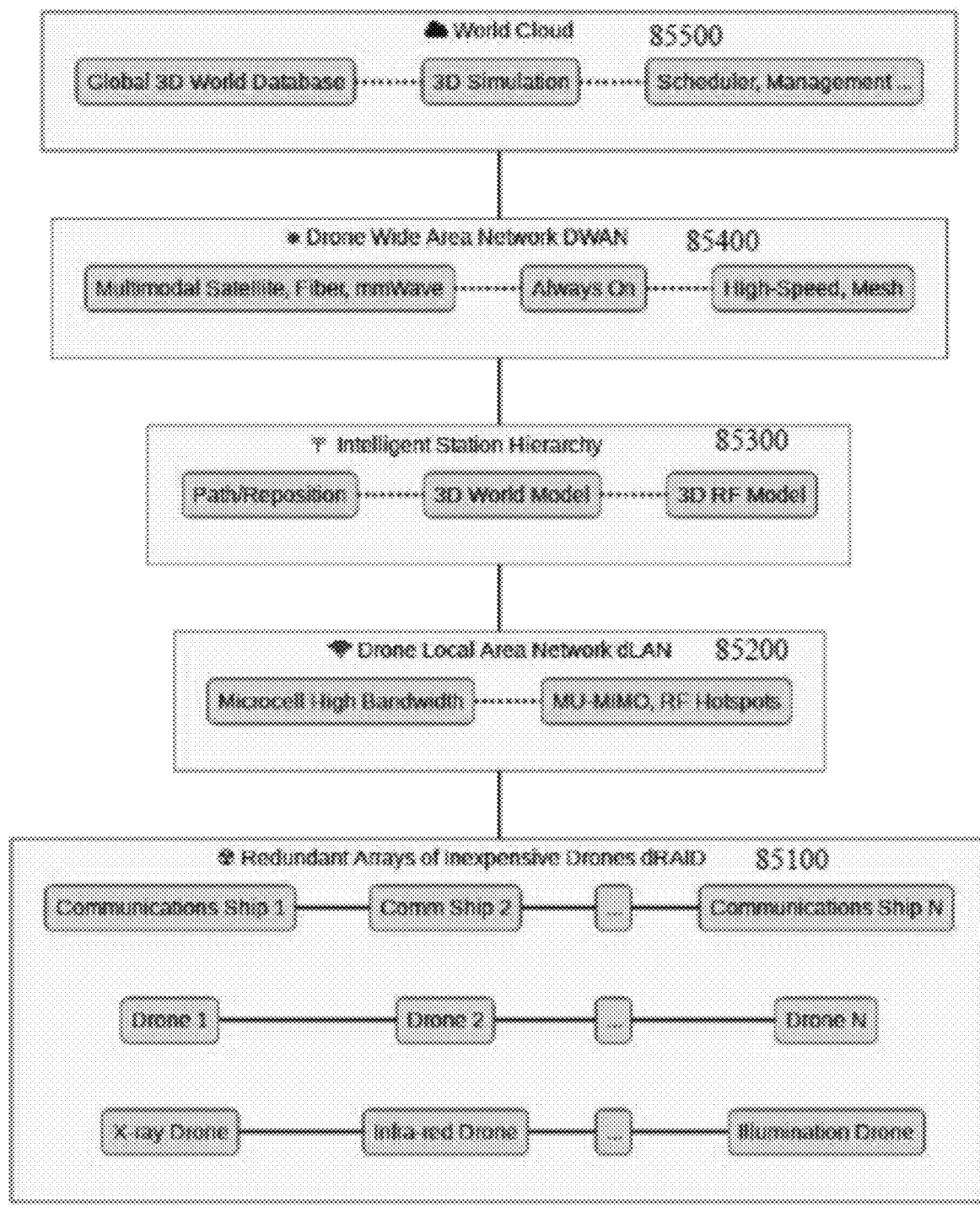
FIG. 8B is an illustrative diagram of an overview of the system, in accordance with various embodiments.

FIG. 8B is an illustrative diagram of an overview of the system 8500, in accordance with various embodiments. Ultralightweight and inexpensive microdrones that can be dynamically configured and reconfigured. They may come together as a unit to form a drone RAID array to provide fault tolerance and temporary multi-mission capabilities and are flown like a single drone. See 85100.

The drone-aware local communications network architecture, drone LAN is a 3D dynamic local area network or 3D-LAN, instead of a static point-to-point network. This allows the drones, acting as nodes within the dynamic 3D wireless network, to constantly communicate and map the RF environment, dynamically creating an RF spectrum map that's used to optimize the flight trajectories in order to find the most efficient balance between flight time, network coverage, bandwidth and communication latency. See 85200.

Computing capability is performed on the base station (hive) to augment the drones. This moves heavy and power-hungry machine learning and 3D world modeling away from the drones. Multiple hives can work together creating a large-scale local compute cluster with high speed communications to many drones. Instead of putting GPS receivers on drones, they are placed on the ground and can use RTK GPS or other positioning in combination with the visual position so that each drone can precisely position itself. See 85300.

This local compute is in turn connected to the highest tier with a 3D wide area network or 3D-LAN that is a drone aware dWAN. The hives constantly map the radio frequencies and bandwidth available to them and can reposition hives to better locations to ensure high bandwidth to the cloud systems. See 85400.

Finally, the cloud computing environment is much more closely integrated with the remote hardware at the mission site. This allows direct processing of real-time data and enables real-time collaboration while the drones are in flight significantly shortening the time to analyze problems in the field. See 85500.

Figure 9:
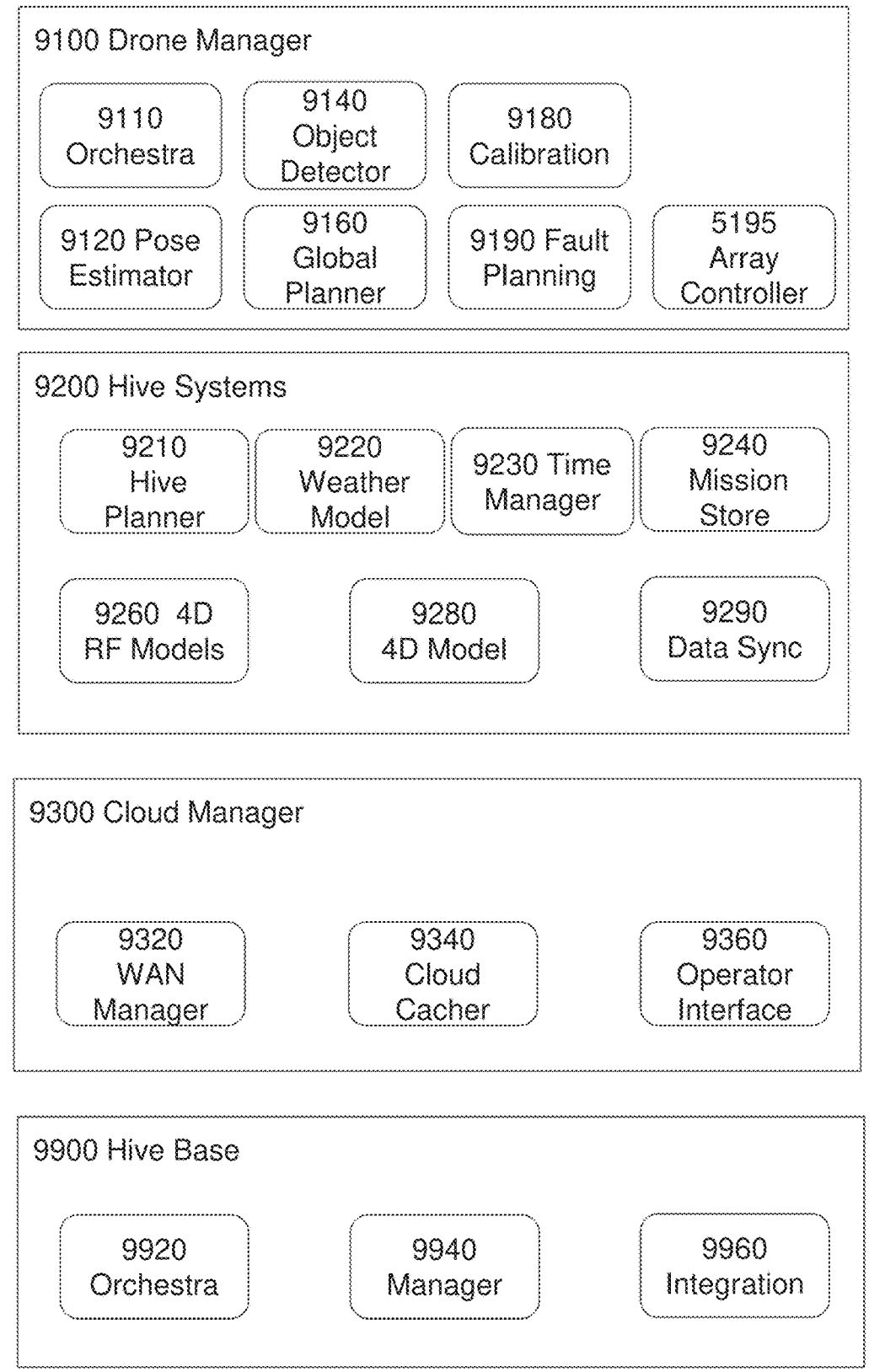
FIG. 9 is a schematic diagram of a hive software architecture, in accordance with various embodiments.

FIG. 9 is a schematic diagram of a hive software architecture 900, in accordance with various embodiments. Hive software architecture 900, which may also be referred to herein interchangeably as a hive 900, may include software modules that include a base system that schedules other software modules across the actual hive hardware. Hive 900 may include a drone manager 9100 configured to provide services for the drones under the hive's control. This may include an orchestra module 9110 configured to manage what containers are running on the drone hardware and what hardware pods of the drones are available under the hive's control. The hive may include a Pose Estimator 10120 that can be configured to monitor the drones and provides an estimate capable of being used to correct a position of some or all of the drones. Object detectors 9140 may provide additional object detection that augment the drone onboard systems. Global Planner 10160 may manage the overall flights of all the drones. Calibration module 10180 may be configured to correct for distortions and sensor errors in individual drones or drone arrays. Fault monitor and planner 10190 may receive notifications of faults and may initiate changes needed in planning. Drones that do not use an onboard controller to manage them as arrays may Array Controller 9195, which may be configured to provide corrections to the onboard Drone Array Controllers 5980 for configuration, positioning, and/or fault recovery.

Internal systems, such as hive systems 9200, may be configured to manage the hive. Hive systems 9200 may include a 9210 Hive Planner that can handle the routing of the hive and coordination with other hives. Local RF models 9260 may manage the local RF environment and can provide a 3D map and time based prediction (4D mapping) of the RF environment locally and the RF environment characteristics for WAN communications. This may be used by the 9100 Drone Manager to plan flights based on data download and upload requirements. Hive Planner 9210 may be configured to move the hive or synchronize with other system modules through Data Sync 9290. Weather model 9220 may be configured to model wind, light, or other dynamic conditions over time and may predict future conditions for use by planning modules throughout the system. The objects in the mission may be kept in a 4D Model system 9280 that has both the 3D and models the changes in time. Mission Store 9240 may manage the mission information, such as paths and desired goals for the missions. Time Manager 9230 may provide a precise clock for all systems including all drones and other hives to allow precise timing for every sensor and other measurements being taken.

Cloud Manager 9300 in the hive may be configured to manage communications to the cloud. Cloud Manager 9300 may include a WAN Manager 9320 to optimizes and schedule transmissions to the cloud, a cloud caching system 9340 that may store and forward information to the cloud from drones or other hives, and an Operator and Integration interface 9360 that can provides status and management facilities from the cloud or a local operator.

Hive 900 may also include a base set of modules 9900 configured to provide common services to all modules. This may include an Orchestra 9920 to manage which software modules to isolate into containers run on which hardware pods. Modules 9900 may also include a manager 9940 that monitors the overall system performance, handles real-time events and logs critical data. Modules 9900 may also include an Integration system 9960 that allows foreign software to interact with the system through a set of connectors or other facilities.

Figure 10:
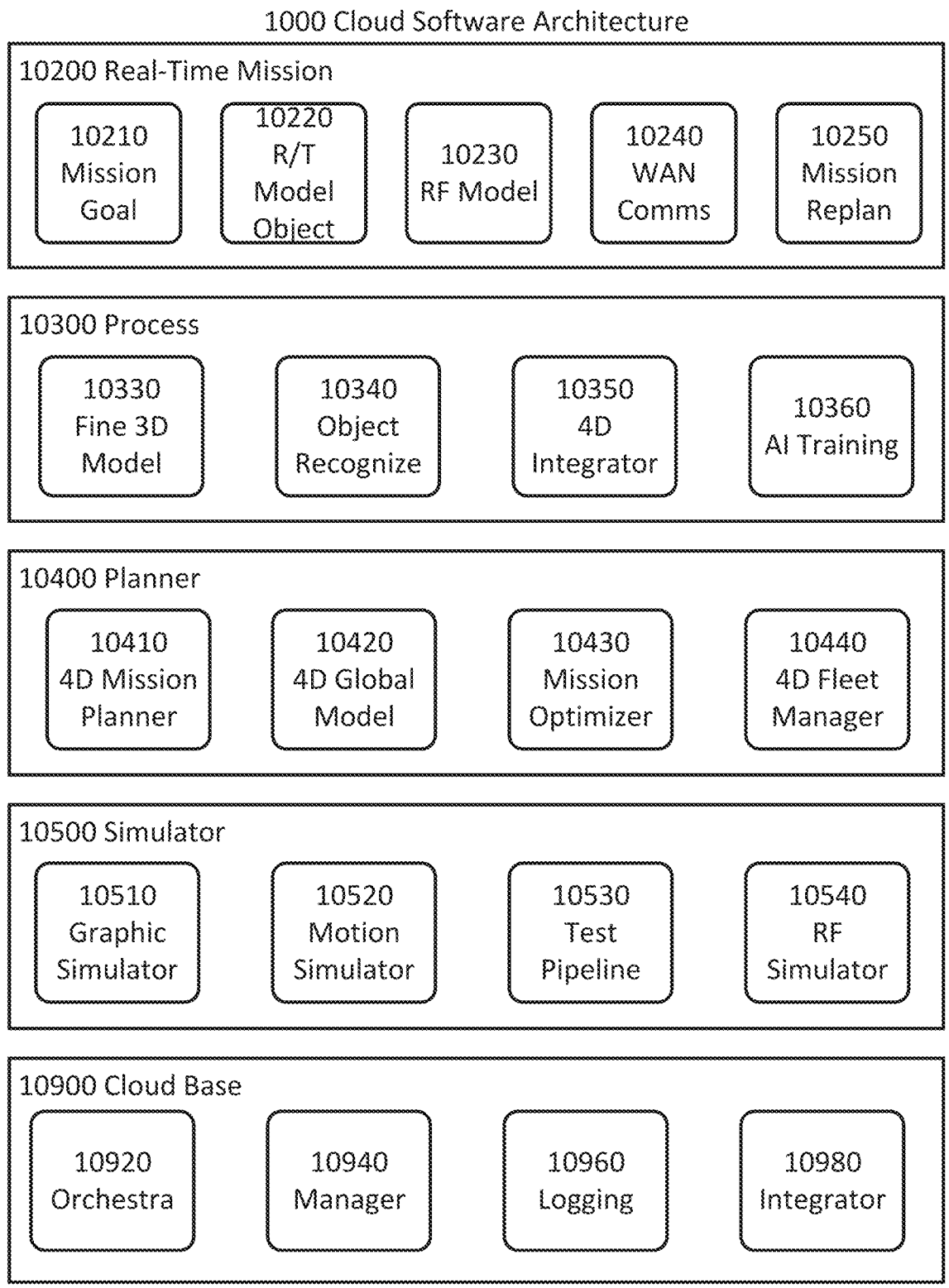
FIG. 10 is a schematic diagram of a cloud software architecture, in accordance with various embodiments.

FIG. 10 is a schematic diagram of a cloud software architecture 1000, in accordance with various embodiments. In some embodiments, cloud software architecture 1000 may include software modules, such as one or more instances of a real-time mission system 10200 for running live missions. Real-time mission system 10200 may include one or more mission goal modules 10210 that may be configured to track the intent of the mission, including, for example, locations to be scanned and a quality of the scans required. It may include one or more 3D model builders and object recognizers 10220 that can take the real-time data from hives or other sources and perform 3D object reconstruction using techniques including, but not limited to, NeRF, photogrammetry or other techniques. The system may also include a real-time 3D RF model 10230 of the site to aid in real-time planning of missions and include communications bandwidth in mission replanning 10250. These modules may communicate with the hives over the hive communications interface WAN Communications interface 10240.

In some embodiments, cloud software architecture 1000 may include a sensor processing pipeline 10300. Sensor processing pipeline 10300 may include a fine grained 3D model 10330, which may run in batch mode and can provide higher resolution to the real-time 3D model builders and object recognizers. Cloud software architecture 1000 may include high resolution nonreal time object recognition and characterization system 10340, and one or more 4D model integrators 10350 configured to that take information from a specific mission and integrate them into a planet wide multimission derived 4D database model 10420.

In some embodiments, cloud software architecture 1000 may include one or more AI training systems 10360 that take the log, path, and other information, such as real images, and may be configured to train the object recognition model 10340 and model builder 10330.

In some embodiments, cloud software architecture 1000 may include one or more simulation systems 10500, which may be configured to aid in the test and planning and other system functions. This software service may include one or more graphic simulators 10510 that may be very high fidelity in the imaging including real-life effects and may include one or more motion simulators 10520 that can model the physics of the drones in motion. In some embodiments, the service may have one or more simulators that integrates these two models. Simulation system 500 may include a test pipeline 10530, which can allow any module to be replaced in software to provide simulation of any software component in the cloud, hive or drones. Simulation system 500 may include an RF simulator 10540 that may be configured to model the real world RF effects of specific sites based on radio data and other information in 4D global model 10420.

Workflow

Figure 11:
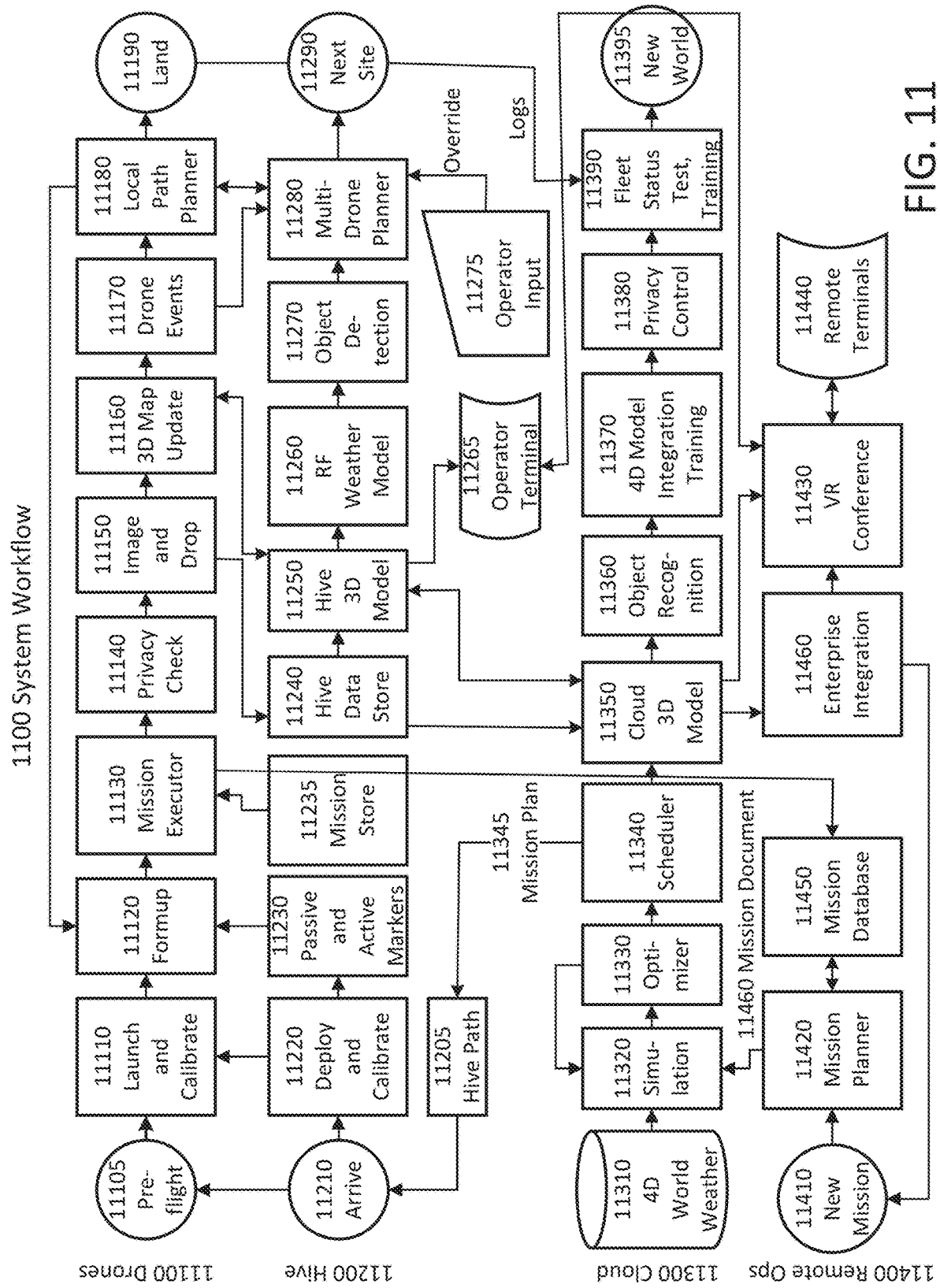
FIG. 11 is a schematic diagram of an example workflow, in accordance with various embodiments.

FIG. 11 is a schematic diagram of an example workflow 1100, in accordance with various embodiments. Workflow 1100 may be applied to a drone mission, and may be performed across one or more drones 11100, one or more hives 11200 with one or more cloud services 11300 with connections to a local operator 11265, and remote operation services 11400 that may be performed away from a mission site.

Workflow 1100 describes an example flow of how information moves and the system works. An operator, who may be a human or another computer module, may provide new mission data 11410 to remote operations services 11400. For example, modules such as fleet status, training, and test module 11390 may run modeling of missions for resource planning to determine fleet requirements in the future based on prior missions. Or if new software or systems in place, the specification may include a list of modules with versions and times to be run to run virtual missions or test the system.

In some embodiments, a new mission specification may be entered into the new mission module 11410. A declarative document may be created that specifies the mission goals such as the resolution and type of sensors to be used in a scan, the objects of interest or areas of interest, what dynamic or moving or unexpected objects are being searched for if not a fixed presence, the resources they have for the goals, such as one or more drones 11100, which may be grouped into one or more pods with one or more unique characteristics. The number and type of hives 11200 available for the drones and their capabilities may vary. It may include the frequency and repetition rate desired. And it may include stored procedures, conditionals and other constructs to specific events and how the mission would change. The specification may also include observability constraints for example it may specify a noise limit for an area to ensure drones are not disruptive, it may specify visibility parameters such as flight paths should not be viewable from particular locations or the drone should be very small to prevent observation assuming a given visual acuity or zoom level. The specification may also include areas that are not to be scanned or have different privacy requirements that may inhibit certain sensors from imaging sensitive objects. These objects may be stationary or they may be dynamic with parameters, and may be detectable using object recognition 11360, which may include face recognition or object types such as underage children.

The objects may be converted by mission program module 11420 into a mission document 11460 that describes the intention of the mission and stored in a mission database 11450. The operator may load, from mission database 11450, and extend, modify, or write new missions or link to missions.

The cloud planning system may takes the current 3D models over time as a 4D model 11310. This may include previous data that is at a similar time and date as well as weather, wind, sun locations and other data. The 4D model may synthesize, interpolate, or otherwise estimate the model of the world for the mission at a given time and weather condition. The model may also include RF signal models, audio signals that appear in the system. It may also include an acoustic propagation model to determine how far audio will travel. It may also include markers or other precisely located physical attributes such as a bridge that act as positioning points that are available visually or by radio or other characteristics such as broadcast towers or cellular towers with known RF characteristics.

In the cloud, simulation system 11320 may start with these parameters. Simulation system 11320 may consist of one or more specialized simulators connected together. As an example, a detailed physics engine may model the wind, weather and the drone movement in great detail and this may feed locations to a detailed visual simulator that has high fidelity imaging. The simulation may insert hardware failures, weather conditions changes and other unexpected events to test the simulation. The simulation may also include a radio frequency model to determine what frequencies are available for communications. It may also model the RF environment and provide data on expected transmission bandwidth and interference given parameters for antennas such as transmit power or beam forming. It may also model interference from other sources such as existing radio transmitters. The simulation may also model the storage available for sensor and imaging and other uses as well as the predicted power used by each device for missions. The simulation may also model the expected GPS or other positioning signals available including the expected multipath and other losses. The simulation may also include an audio model that may include drone noise, the audio signals expected to be found and parameters for recording audio such as anomalous engine or other noises.

Optimizer 11330 may then analyzes and segments the mission into a number of segments which are allocated to physical drone pods to complete that run on one or more hives and may ensure manage the APs and other RF devices power and beamforming and may optimize the positioning of various antennas such as for GPS, drone LAN (dLAN), which refers to a LAN implemented using a swarm of homogenous, heterogeneous, or an amalgamation thereof of autonomous or semiautonomous multimodal drones, or dWAN. A swarm may be referred to herein interchangeably as a drone cluster or drone swarm. The optimizer may run a series of simulations and models with different mission document 11460 parameters and may optimize the mission based on loss function which may include mission time, power required to complete the mission, redundancy required and probability of mission failure or success. The optimizer may add multiple hives, as an example, if it determines wind or path are too long so the optimizer may launch drones upwind and they may land downwind to a waiting hive. Or the optimizer may change hive path plans so a hive may launch at one location and recover drones at another. The optimizer may also determine fixed locations where drones may land and image systems to optimize battery life or other parameters. As an example, if a flight is repetitive, the optimizer may land a drone and put it into a sleep mode away from hives to minimize travel time and power usage and then "pop up" as necessary to take images and land again. Or if a suitable point is found for imaging, the optimizer may fly one or more drones to fixed locations to image to reduce flight times. The optimizer may analyze expected communication needs vs the available backhaul capacity is analyzed. The optimizer may allocate drones and hives to be part of a temporary backhaul network from drones to hives and also from hives to the cloud.

Scheduler 11340 may determine what drone and other hardware such as hives are available for the mission. The scheduler may bid for drone resources from the internal pool and any externally sourced drones owned by third parties. The scheduler may merge existing missions that are to be run in the mission database 11450. and may calculate new virtual missions that may include multiple missions so that a single physical mission run may include multiple desired scans. For example, if two buildings are physically close together, the scheduler may run both missions simultaneously with drones already in flight. Or if the RF environment prevents one hive from doing an upload, it may merge missions so that hives across missions may pass data to the cloud or other locations. It may place these packed missions into mission database 11450 and run the mission planner repetitively to optimize the resource requirements one or more times.

Cloud system 11300 may run the merged missions through the simulation system 11320 to ensure correctness, monitor the reliability of the network through fault injection. This may occur repetitively or may follow a sequence of events.

The allocated hives and drones for a mission may then be scheduled by scheduler 11340, which may schedule hierarchically allocating hives in pods or groups and the allocation pods of drones. Scheduler 11340 may provide each hive with a specific part of the mission plan 11345 to complete the goals with the resources available. Mission plan 11345 may compensate for possible hardware failures, by providing additional hives, drones or other hardware to provide redundancy and fault tolerance. For example, if three drones in a pod are required for a mission, the mission plan may allocate two extra drones to tolerate up to two drones failing or not having enough power.

Hives 11200 may then be piloted by humans with instructions included in mission plan 11345 or may pilot autonomously and state arrival process 11210. In arrival process 11210, hives 11200 may position themselves in multiple locations.

In deploy and calibrate module 11220, the hives may be configured to move to the correct locations and turn on their positioning and identifications systems. The hive may do high precision positioning based on previous survey markers and differential GPS, RTK and using the cellular network to act as the base point for drone flights. This may augment the GPS or other visual positioning that may be carried on drones 11100. The calibration may use existing passive markers on the hives or other equipment or may activate active lights and RF markers 11230 to provide additional positioning information for the drones.

Drones 11100 may upon hive arrival begin their preflight process 11105 to check their systems and ensure they can operate safely.

Drones 11100 may then enter their launch and calibrate module 11110 and perform basic checks to ensure each drone is operating nominally. Drones 11100 may image known objects to ensure that optical and other systems are working properly. They may for example orbit their launching hive and observe the visual and RF markers 11230 to calibrate their visual systems and may correct optical flaws such as dirty lens or estimate the visibility issues such as fog or rain. They may also calibrate their RF systems and ensure that there are no unanticipated network problems. Prior to takeoff, the hive (with accelerometers) may determine that the system is stationary and level. Once stationary and level, the hive places the drones in calibration mode where they zero out biases on the accelerometers and rate gyroscopes. The drones take off, may have calibrated markers that are place on the hive or in previously deployed markers in view to get an initial 6DoF pose, they do a compass calibration by slowing yawing at a speed of less than 40 degree/second and calibrating for local magnetic disturbances.

Drones 11100 may operate in formup module 11120 in arrays so failures at the array level are handled there and there are problems the drone arrays compensate with additional flights if possible or more likely by using spare drones. The drones may use visual markers and active markers on one or more hives to provide additional localization and this may be used to ensure the separation between drones is adequate and localization is accurate.

The drones in the mission executor 11130 may load the mission parameters from the mission store 11235. The mission execution may have drones that may "hop" from one hive to another to reach the final site for imaging. Drones may be assigned to different tasks depending on their capabilities either singly or in a pod. For example some may stay to act as overall controllers of the scene. Drones or hives may localize points and keep other drones in view to provide an overall view of the objects and the drones and hives. Others drones may be allocated to be communications backhaul tasks if there are dark regions that lack coverage or there is the need for additional bandwidth.

As with drones, the privacy check system 11140 may detect existing markers or identify locations that have attached NFTs in the 4D map. The drones mainly examine the privacy rights information kept on those NFTs and they may have distributed ledgers or other data restricting access for different kinds of imaging. The privacy check may terminate or may cryptographically seal the data they capture for only authorized entities.

As the drones fly, they can activate image and drop module 11150. They may image the scene with various sensors, they may sample the RF environment, and/or they may sample the weather and atmospheric conditions for clouds. They may, if in the correct location, drop artifacts such as position markers both passive and active visual or RF markers to note the exact positions. These markers may be permanent and allow more efficient rescans later. The drones may themselves become markers and land at specific locations providing both camera, optical, RF markers as well as provide input to other systems.

Drones may drop NFT markers as appropriate to mark the survey space and serve as physical and virtual tags that the data was acquired. If there are existing markers, the survey information will be added to those tokens. These act as the equivalent of a physical "door hanger" saying that your property was just surveyed and leaving the name of the surveyor. This provides a distributed ledger or all parties that have surveyed an area.

Drones may transmit their imaging and other data to one or more hive data stores 11240 that may cache this information and may delay their transmission until they determine or the mission plan or the hive determines there is available bandwidth. They may alter course to fly into RF hotspots to optimize the transmission time and bandwidth across the entire system.

Hive data stores 11240 may transmit any or all of the raw sensor data to cloud 3D model 11250 depending on communications bandwidth.

Drones may use a 3D map update 11160 to reconstruct the 3D world around them. They may perform both object avoidance flags for unexpected obstacles in their path. They may automatically recognize objects and place them into a 3D world that may include both the immediate world around them and they may also place themselves into an Atlas of previously loaded words to locate themselves in the larger world.

One or more hives may individually or working together use the hive 3D model 11250 and may construct an RF Map and a 3D World map that may be an enhancement of the models loaded from cloud 3D model 11350. As various features are mapped, the hives may perform realtime SLAM to create a picture of the world and determine precise locations and corrections available to the hive because it has more inputs and more computation power. These corrections may be synchronized back to the drone 3D map update 11160.

Cloud 3D model 11350 may also generate precise information given the great computational power available in a cloud service and synchronize and correlate these differences with the hive 3D model. The onsite hives may use their dynamic backhaul network to relay information to the cloud.

The hive may update its RF, weather models 11260 based on information from other hives and drones to place into the 3D model.

The hive may use the object detection system 11270 to identify additional objects in the object detection system.

The drones may together or individually generate drone events 11170 different problems and notifications. For example, if a drone encounters physical problems in the environment such as an unexpected obstacle or failures such a power loss or unexpected low battery occur and these may result in the drone event initiating various actions such as return to home or stop traveling or land immediately.

Drone event 11170 may send these events to one or more hive multidrone planner modules 11280 to reschedule and change missions. The hive drone event may schedule additional paths to be run, modify the path plans, launch preflight 11105 additional drones, or reassign existing hives and drones with new plans as needed to ensure a good mission. The planner may handle a wide variety of events. It may have drones return to hives for recharge, it may reallocate drones that are temporarily unavailable back to new drone pods and it may direct one or more drones to recharge at one or more different hives.

Local path planner 11180 may obtain drone events 11170 and complete its own mission plan for individual drones, and can operate without hive communications.

MultiDrone planner 11280 may send its path plans to drone local path planner 11180 when it determines that a better plan is available or that there is global change needed or that it has a better plan because it has more precise positioning.

As the local path planner 11180 receives these events, it may return to formup 11120 if new formations are required and then can execute one or more mission modules 11130, 11140, 11150, 11160 and 11170 as appropriate to the missions.

When the local path planner 11180 determines the mission is complete, the drones begin their landing 11190 sequence. The drones may return to the launching hive, the hive may move to a different location based on wind and weather patterns or the drones may return to a different hive as determined by Global Mission Planner 11280.

Hives 11200 may use the Next Site module 11290 to determine where they go next. The hives main The hives may return to pool awakening and the hives and drones may be split and sent to different sites or powered down awaiting new work.

The Next Site 11290 may send the logs that may include the mission actual paths and new world model sent to Fleet Status, Test and Training module 11390. The actual and predicted paths and resulting data sent to the cloud so that they may be used to train recognition, simulation and other systems to more closely match what was actually found.

Cloud 11300 may process the data in the New World model 11395. The 3D world data may be integrated into the global model 11310, the new objects found may be trained against the system and the simulator 11320 can be corrected for errors in prediction, and optimizer 11330 for errors in the paths planned.

An onsite operator may use one or more Operator Terminal 11265 to view the Hive 3D Model 11250 and assess the mission and flight. Operator Input 11275 may provide input into multidrone planner 11280 that may modify the mission such as taking manual control of drones, ordering an early stop, adding new mission parameters.

Remote operators may access the live drone data from the Cloud 3D Model 11350 and may initial a virtual reality (VR) conference 11430 to allow multiple remote operators the ability to see and communicate through the remote terminals 11440. They may communicate with onsite Operator Terminals 11265 and may order changes or additions to the mission plan as needed to meet their requirements.

Cloud 3D Model 11350 may integrate with other systems passing appropriate data through the Enterprise Integration 11460, which may connect with systems such as construction building information systems. Enterprise integration 11460 may allow automatic mission planner by injecting new missions 11410 autonomously into the system and may provide additional information in VR conference system 11430.

Some embodiments, such as those where a single mission is to be flown at a single location by a few drones, may include 4D World 11310 being loaded with the location data and a single hive is in the Simulation 11320. Hive 11200 may have a human driver to take it to a new site. Then one or more drones 11100 (e.g., three drones), may begin Preflight 11105 and then fly the missions without interruption. The drones can provide image information in Image and Drop 11150 and update the Hive Data Store 11240, which may subsequently update the Hive 3D Model 11250 and the Cloud 3D Model 11350. Cloud 11300 may then provide that data to Model Integration and Training system 11370 to update 4D world model 11310. Drones 11100 may land with Land 11190 and then Next Site Module 11290 can route them to the next site for additional survey.

An example use case may relate to planning a city wide survey system that feeds multiple enterprises and can use drones from multiple sources. In this case a number of different operators may manually or automatically, through Integration 11370, create a large set of missions each with different privacy settings as may be monitored in the drone Privacy Check 11140 at imaging time and may be filtered out or encrypted in the model with Privacy Control 11380. The Mission Planner 11420 may aggregate available hives 11200 and drones 11100 from many different owners and operators into a single Mission Database 11450. Optimizer 11330 can then simulate 11320 the entire multimission, multisite model and determine the best as may be measured in lower cost, meeting required accuracy and faster as may be weighted by different missions requirements. Scheduler 11340 may dispatch multiple hives along distinct routes as specified in Hive Plan 11205. As each hive Arrives 11210, they will deploy and calibrate 11220 each hive and then launch and calibrate 11110 drones as needed in various sequences and in parallel to minimize potential for collisions. Finally, the drones may form up into pods to accomplish their missions as specified by the Mission Executor 11130.

Each hive can manage a set of drones and reroute drones as appropriate in the MultiDrone Planner 11280. As drones complete missions and begin Landing 11190, the hives may asynchronously land the appropriate drones and move to the Next Site 11290. The various missions may finish at different times and asynchronously Cloud 3D Model 11350 can receive updates. Enterprise Integration 11460 can be notified and Privacy Control 11380 can ensure that the data rights are observed so only images destined for one client are shown to them and are invisible to others in the multitenant system.

Figure 12:
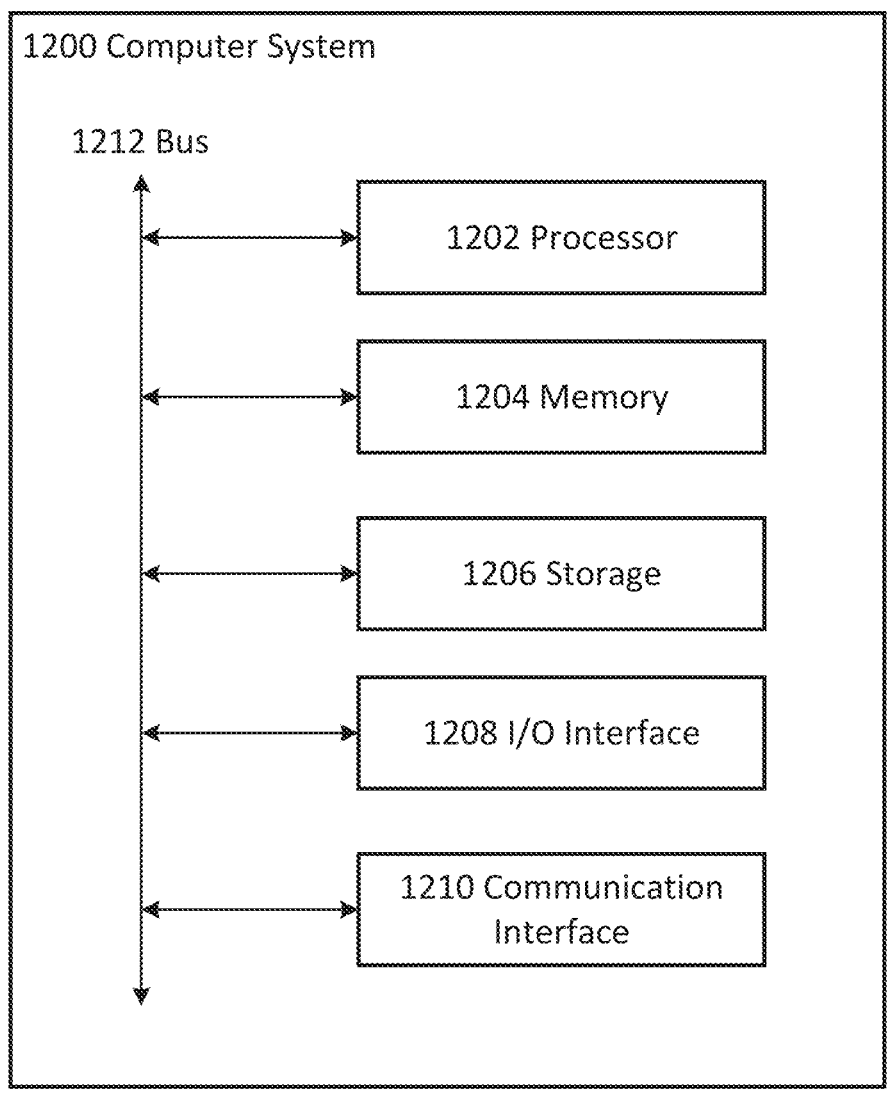
FIG. 12 illustrates an example computer system.

FIG. 12 illustrates an example computer system 1200. In particular embodiments, one or more computer systems 1200 perform one or more steps of one or more methods described or illustrated herein. In particular embodiments, one or more computer systems 1200 provide functionality described or illustrated herein. In particular embodiments, software running on one or more computer systems 1200 performs one or more steps of one or more methods described or illustrated herein or provides functionality described or illustrated herein. Particular embodiments include one or more portions of one or more computer systems 1200. Herein, reference to a computer system may encompass a computing device, and vice versa, where appropriate. Moreover, reference to a computer system may encompass one or more computer systems, where appropriate.

This disclosure contemplates any suitable number of computer systems 1200. This disclosure contemplates computer system 1200 taking any suitable physical form. As example and not by way of limitation, computer system 1200 may be an embedded computer system, a systemonchip (SOC), a singleboard computer system (SBC) (such as, for example, a computeronmodule (COM) or systemonmodule (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1200 may include one or more computer systems 1200; be unitary or distributed; span multiple locations; span multiple machines; span multiple data centers; or reside in a cloud, which may include one or more cloud components in one or more networks. Where appropriate, one or more computer systems 1200 may perform without substantial spatial or temporal limitation one or more steps of one or more methods described or illustrated herein. As an example and not by way of limitation, one or more computer systems 1200 may perform in real time or in batch mode one or more steps of one or more methods described or illustrated herein. One or more computer systems 1200 may perform at different times or at different locations one or more steps of one or more methods described or illustrated herein, where appropriate.

In particular embodiments, computer system 1200 includes a processor 1202, memory 1204, storage 1206, an input/output (I/O) interface 1208, a communication interface 1210, and a bus 1212. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage 1206; decode and execute them; and then write one or more results to an internal register, an internal cache, memory 1204, or storage 1206. In particular embodiments, processor 1202 may include one or more internal caches for data, instructions, or addresses. This disclosure contemplates processor 1202 including any suitable number of any suitable internal caches, where appropriate. As an example and not by way of limitation, processor 1202 may include one or more instruction caches, one or more data caches, and one or more translation lookaside buffers (TLBs). Instructions in the instruction caches may be copies of instructions in memory 1204 or storage 1206, and the instruction caches may speed up retrieval of those instructions by processor 1202. Data in the data caches may be copies of data in memory 1204 or storage 1206 for instructions executing at processor 1202 to operate on; the results of previous instructions executed at processor 1202 for access by subsequent instructions executing at processor 1202 or for writing to memory 1204 or storage 1206; or other suitable data. The data caches may speed up read or write operations by processor 1202. The TLBs may speed up virtualaddress translation for processor 1202. In particular embodiments, processor 1202 may include one or more internal registers for data, instructions, or addresses. This disclosure contemplates processor 1202 including any suitable number of any suitable internal registers, where appropriate. Where appropriate, processor 1202 may include one or more arithmetic logic units (ALUs); be a multicore processor; or include one or more processors 1202. Although this disclosure describes and illustrates a particular processor, this disclosure contemplates any suitable processor.

In particular embodiments, memory 1204 includes main memory for storing instructions for processor 1202 to execute or data for processor 1202 to operate on. As an example and not by way of limitation, computer system 1200 may load instructions from storage 1206 or another source (such as, for example, another computer system 1200) to memory 1204. Processor 1202 may then load the instructions from memory 1204 to an internal register or internal cache. To execute the instructions, processor 1202 may retrieve the instructions from the internal register or internal cache and decode them. During or after execution of the instructions, processor 1202 may write one or more results (which may be intermediate or final results) to the internal register or internal cache. Processor 1202 may then write one or more of those results to memory 1204. In particular embodiments, processor 1202 executes only instructions in one or more internal registers or internal caches or in memory 1204 (as opposed to storage 1206 or elsewhere) and operates only on data in one or more internal registers or internal caches or in memory 1204 (as opposed to storage 1206 or elsewhere). One or more memory buses (which may each include an address bus and a data bus) may couple processor 1202 to memory 1204. Bus 1212 may include one or more memory buses, as described below. In particular embodiments, one or more memory management units (MMUs) reside between processor 1202 and memory 1204 and facilitate accesses to memory 1204 requested by processor 1202. In particular embodiments, memory 1204 includes random access memory (RAM). This RAM may be volatile memory, where appropriate This RAM may be dynamic RAM (DRAM) or static RAM (SRAM). Moreover, where appropriate, this RAM may be singleported or multiported RAM. This disclosure contemplates any suitable RAM. Memory 1204 may include one or more memories 1204, where appropriate. Although this disclosure describes and illustrates particular memory, this disclosure contemplates any suitable memory.

In particular embodiments, storage 1206 includes mass storage for data or instructions. As an example and not by way of limitation, storage 1206 may include a hard disk drive (HDD), a floppy disk drive, flash memory, an optical disc, a magnetooptical disc, magnetic tape, or a Universal Serial Bus (USB) drive or a combination of two or more of these. Storage 1206 may include removable or nonremovable (or fixed) media, where appropriate. Storage 1206 may be internal or external to computer system 1200, where appropriate. In particular embodiments, storage 1206 is nonvolatile, solidstate memory. In particular embodiments, storage 1206 includes readonly memory (ROM). Where appropriate, this ROM may be maskprogrammed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1206 taking any suitable physical form. Storage 1206 may include one or more storage control units facilitating communication between processor 1202 and storage 1206, where appropriate. Where appropriate, storage 1206 may include one or more storages 1206. Although this disclosure describes and illustrates particular storage, this disclosure contemplates any suitable storage.

In particular embodiments, I/O interface 1208 includes hardware, software, or both, providing one or more interfaces for communication between computer system 1200 and one or more I/O devices. Computer system 1200 may include one or more of these I/O devices, where appropriate. One or more of these I/O devices may enable communication between a person and computer system 1200. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1208 for them. Where appropriate, I/O interface 1208 may include one or more device or software drivers enabling processor 1202 to drive one or more of these I/O devices. I/O interface 1208 may include one or more I/O interfaces 1208, where appropriate. Although this disclosure describes and illustrates a particular I/O interface, this disclosure contemplates any suitable I/O interface.

In particular embodiments, communication interface 1210 includes hardware, software, or both providing one or more interfaces for communication (such as, for example, packetbased communication) between computer system 1200 and one or more other computer systems 1200 or one or more networks. As an example and not by way of limitation, communication interface 1210 may include a network interface controller (NIC) or network adapter for communicating with an Ethernet or other wirebased network or a wireless NIC (WNIC) or wireless adapter for communicating with a wireless network, such as a WIFI network. This disclosure contemplates any suitable network and any suitable communication interface 1210 for it. As an example and not by way of limitation, computer system 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1200 may communicate with a wireless PAN (WPAN) (such as, for example, a BLUETOOTH WPAN or ultrawideband WPAN), a WIFI network, a WIMAX network, a cellular telephone network (such as, for example, a Global System for Mobile Communications (GSM) network), or other suitable wireless network or a combination of two or more of these. Computer system 1200 may include any suitable communication interface 1210 for any of these networks, where appropriate. Communication interface 1210 may include one or more communication interfaces 1210, where appropriate. Although this disclosure describes and illustrates a particular communication interface, this disclosure contemplates any suitable communication interface.

In particular embodiments, bus 1212 includes hardware, software, or both coupling components of computer system 1200 to each other. As an example and not by way of limitation, bus 1212 may include an Accelerated Graphics Port (AGP) or other graphics bus, an Enhanced Industry Standard Architecture (EISA) bus, a frontside bus (FSB), a HYPERTRANSPORT (HT) interconnect, an Industry Standard Architecture (ISA) bus, an INFINIBAND interconnect, a lowpincount (LPC) bus, a memory bus, a Micro Channel Architecture (MCA) bus, a Peripheral Component Interconnect (PCI) bus, a PCIExpress (PCIe) bus, a serial advanced technology attachment (SATA) bus, a Video Electronics Standards Association local (VLB) bus, or another suitable bus or a combination of two or more of these. Bus 1212 may include one or more buses 1212, where appropriate. Although this disclosure describes and illustrates a particular bus, this disclosure contemplates any suitable bus or interconnect.

Herein, a computer readable nontransitory storage medium or media may include one or more semiconductor based or other integrated circuits (ICs) (such, as for example, field programmable gate arrays (FPGAs) or application specific ICs (ASICs)), hard disk drives (HDDs), hybrid hard drives (HHDs), optical discs, optical disc drives (ODDs), magneto optical discs, magneto optical drives, floppy diskettes, floppy disk drives (FDDs), magnetic tapes, solid state drives (SSDs), RAMdrives, SECURE DIGITAL cards or drives, any other suitable computer readable nontransitory storage media, or any suitable combination of two or more of these, where appropriate. A computer readable nontransitory storage medium may be volatile, nonvolatile, or a combination of volatile and nonvolatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, any reference herein to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

EXAMPLE EMBODIMENTS

Embodiments disclosed herein may include the following in any combination.

One or more embodiments may include a method for generating a model of a scene comprising: receiving a plurality of images of a scene captured by at least one drone; identifying features within the plurality of images; identifying similar images of the plurality of images based on the features identified within the plurality of images; comparing the similar images based on the features identified within the similar images to determine a proportion of features shared by the similar images; selecting a subset of the plurality of images that have a proportion of shared features that meets a predetermined range; generating a first 3D model of the scene from the subset of images using a first 3D model building algorithm; generating a second 3D model of the scene from the subset of images using a second 3D model building algorithm; computing errors for the first and second 3D models; and selecting as the model of the scene the first or second 3D model depending on the computed errors.

In any of these embodiments, identifying features within the plurality of images may include generating features vectors for the images, and identifying similar images may include computing similarity scores based on the feature vectors and determining that a pair of images are similar when the corresponding similarity score is above a threshold.

In any of these embodiments, identifying similar images may include comparing each image with a subset of images selected based on timestamps associated with the images.

In any of these embodiments, identifying similar images may include generating a covisibility graph in which vertices are images and edges linking vertices indicate similar images. Optionally, comparing the similar images includes comparing features of a respective image with features of images that are linked by an edge to the respective image in the covisibility graph.

In any of these embodiments, selecting a subset of the plurality of images may include selecting images that share more than a lower threshold of features with any other image and less than an upper threshold of features with any other image.

In any of these embodiments, the method may include receiving estimated poses for the plurality of images and generating at least one of the first and second 3D models based on the estimated poses.

In any of these embodiments, the method may include generating pose estimates for the plurality of images using the first 3D model building algorithm and using the generated pose estimates for building the second 3D model.

In any of these embodiments, the first 3D model building algorithm may be a Structure from Motion (SfM) algorithm and the second 3D model building algorithm may be a Neural Radiance Field (NeRF) algorithm.

In any of these embodiments, the errors may be computed by rendering a two-dimensional view from each of the first and second 3D models of the scene and comparing the two-dimensional view to at least one of the plurality of images that was not used to generate the first and second 3D models of the scene.

In any of these embodiments, the first 3D model building algorithm may be a SfM model, the first 3D model of the scene is selected, and the method further comprises compressing the first 3D model of the scene.

In any of these embodiments, the method may include compressing the first 3D model of the scene using a NeRF algorithm.

One or more embodiments can include a system comprising a base station communicatively coupled to a plurality of drones, the base station comprising one or more processors, memory, and one or more programs stored in the memory for execution by the one or more processors for performing any of the above methods.

A nontransitory computer readable medium comprising instructions that, when executed by one or more processors of a computing system, cause the computing system to perform the method of any of the above methods.

The invention claimed is:

1. A method for generating a model of a scene comprising:
receiving a plurality of images of a scene captured by at least one drone;
identifying features within the plurality of images;
identifying similar images of the plurality of images based on the features identified within the plurality of images;
comparing the similar images based on the features identified within the similar images to determine a proportion of features shared by the similar images;
selecting a subset of the plurality of images that have a proportion of shared features that meets a predetermined range;
generating a first 3D model of the scene from the subset of images using a first 3D model building algorithm;
generating a second 3D model of the scene from the subset of images using a second 3D model building algorithm;
computing errors for the first and second 3D models; and
selecting as the model of the scene the first or second 3D model depending on the computed errors.

2. The method of claim 1, wherein identifying features within the plurality of images comprises generating features vectors for the images, and identifying similar images comprises computing similarity scores based on the feature vectors and determining that a pair of images are similar when the corresponding similarity score is above a threshold.

3. The method of claim 1, wherein identifying similar images comprises comparing each image with a subset of images selected based on timestamps associated with the images.

4. The method of claim 1, wherein identifying similar images comprises generating a covisibility graph in which vertices are images and edges linking vertices indicate similar images.

5. The method of claim 4, wherein comparing the similar images comprises comparing features of a respective image with features of images that are linked by an edge to the respective image in the covisibility graph.

6. The method of claim 1, wherein selecting a subset of the plurality of images comprises selecting images that share more than a lower threshold of features with any other image and less than an upper threshold of features with any other image.

7. The method of claim 1, further comprising receiving estimated poses for the plurality of images and generating at least one of the first and second 3D models based on the estimated poses.

8. The method of claim 1, further comprises generating pose estimates for the plurality of images using the first 3D model building algorithm and using the generated pose estimates for building the second 3D model.

9. The method of claim 1, wherein the first 3D model building algorithm is a Structure from Motion (SfM) algorithm and the second 3D model building algorithm is a Neural Radiance Field (NeRF) algorithm.

10. The method of claim 1, wherein the errors are computed by rendering a two-dimensional view from each of the first and second 3D models of the scene and comparing the two-dimensional view to at least one of the plurality of images that was not used to generate the first and second 3D models of the scene.

11. The method of claim 1, wherein the first 3D model building algorithm is a SfM model, the first 3D model of the scene is selected, and the method further comprises compressing the first 3D model of the scene.

12. The method of claim 11, comprising compressing the first 3D model of the scene using a NeRF algorithm.

13. A system comprising a base station communicatively coupled to a plurality of drones, the base station comprising one or more processors, memory, and one or more programs stored in the memory for execution by the one or more processors for:
receiving a plurality of images of a scene captured by at least one drone;
identifying features within the plurality of images;
identifying similar images of the plurality of images based on the features identified within the plurality of images;
comparing the similar images based on the features identified within the similar images to determine a proportion of features shared by the similar images;
selecting a subset of the plurality of images that have a proportion of shared features that meets a predetermined range;
generating a first 3D model of the scene from the subset of images using a first 3D model building algorithm;
generating a second 3D model of the scene from the subset of images using a second 3D model building algorithm;
computing errors for the first and second 3D models; and
selecting as the model of the scene the first or second 3D model depending on the computed errors.

14. A nontransitory computer readable medium comprising instructions that, when executed by one or more processors of a computing system, cause the computing system to perform the method of:
receiving a plurality of images of a scene captured by at least one drone;
identifying features within the plurality of images;
identifying similar images of the plurality of images based on the features identified within the plurality of images;
comparing the similar images based on the features identified within the similar images to determine a proportion of features shared by the similar images;
selecting a subset of the plurality of images that have a proportion of shared features that meets a predetermined range;
generating a first 3D model of the scene from the subset of images using a first 3D model building algorithm;

generating a second 3D model of the scene from the subset of images using a second 3D model building algorithm;

computing errors for the first and second 3D models; and selecting as the model of the scene the first or second 3D model depending on the computed errors.

\* \* \* \* \*